(12) United States Patent
Marolia et al.

(10) Patent No.: US 7,987,449 B1
(45) Date of Patent: Jul. 26, 2011

(54) NETWORK FOR LIFECYCLE MANAGEMENT OF FIRMWARE AND SOFTWARE IN ELECTRONIC DEVICES

(75) Inventors: Sunil Marolia, Dana Point, CA (US); Teck Chia, Aliso Viejo, CA (US); John D. V. Dinh, San Diego, CA (US); Sidney Andrew Jacobi, San Marcos, CA (US); Bindu Rama Rao, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 603 days.

(21) Appl. No.: 10/852,396

(22) Filed: May 24, 2004
(Under 37 CFR 1.47)

Related U.S. Application Data

(60) Provisional application No. 60/472,577, filed on May 22, 2003.

(51) Int. Cl.
*G06F 9/44* (2006.01)
*G06F 9/445* (2006.01)
*G06F 15/16* (2006.01)

(52) U.S. Cl. ........ 717/120; 717/121; 717/122; 717/168; 717/174; 709/220; 709/221; 709/222

(58) Field of Classification Search .......... 717/102–122, 717/168–178; 709/220–222
See application file for complete search history.

(56) References Cited

U.S. PATENT DOCUMENTS

| | | | |
|---|---|---|---|
| 5,261,055 A | 11/1993 | Moran et al. | 395/275 |
| 5,442,771 A | 8/1995 | Filepp et al. | 395/650 |
| 5,479,637 A | 12/1995 | Lisimaque et al. | 395/430 |
| 5,579,522 A | 11/1996 | Christeson et al. | 395/652 |
| 5,596,738 A | 1/1997 | Pope | 395/430 |
| 5,598,534 A | 1/1997 | Haas | 395/200.09 |
| 5,608,910 A | 3/1997 | Shimakura | 395/670 |
| 5,623,604 A | 4/1997 | Russell et al. | 395/200.1 |
| 5,666,293 A | 9/1997 | Metz et al. | 395/200.5 |
| 5,752,039 A | 5/1998 | Tanimura | 395/712 |
| 5,768,382 A * | 6/1998 | Schneier et al. | 380/251 |
| 5,778,440 A | 7/1998 | Yiu et al. | 711/154 |
| 5,790,974 A | 8/1998 | Tognazzini | 701/204 |
| 5,878,256 A | 3/1999 | Bealkowski et al. | 395/652 |
| 5,960,445 A | 9/1999 | Tamori et al. | 707/203 |
| 6,009,497 A | 12/1999 | Wells et al. | 711/103 |
| 6,038,636 A | 3/2000 | Brown, III et al. | 711/103 |
| 6,064,814 A | 5/2000 | Capriles et al. | 395/701 |
| 6,073,206 A | 6/2000 | Piwonka et al. | 711/102 |
| 6,073,214 A | 6/2000 | Fawcett | 711/133 |
| 6,088,759 A | 7/2000 | Hasbun et al. | 711/103 |

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner* — Jason Mitchell

(57) ABSTRACT

Disclosed herein is an electronic device network for lifecycle management of firmware and software in electronic devices. The electronic device network may also be adapted to manage configuration parameters in the electronic devices. Lifecycle management provided by the electronic device network may include firmware and software downloading, firmware and software updating, and remote locking and remote enabling of electronic device capability. An update store module in the electronic device network may be adapted to dispense update packages to requesting electronic devices. The electronic devices may employ one or a plurality of update agents to update software and firmware therein.

31 Claims, 32 Drawing Sheets

U.S. PATENT DOCUMENTS

| | | | | |
|---|---|---|---|---|
| 6,105,063 | A | 8/2000 | Hayes, Jr. | 709/223 |
| 6,112,024 | A | 8/2000 | Almond et al. | 395/703 |
| 6,112,197 | A | 8/2000 | Chatterjee et al. | 707/3 |
| 6,126,327 | A | 10/2000 | Bi et al. | 395/200.51 |
| 6,128,695 | A | 10/2000 | Estakhri et al. | 711/103 |
| 6,157,559 | A | 12/2000 | Yoo | 365/52 |
| 6,163,274 | A | 12/2000 | Lindgren | 340/825.44 |
| 6,198,946 | B1* | 3/2001 | Shin et al. | 455/561 |
| 6,223,343 | B1* | 4/2001 | Hopwood et al. | 717/101 |
| 6,279,153 | B1 | 8/2001 | Bi et al. | 717/11 |
| 6,311,322 | B1 | 10/2001 | Ikeda et al. | 717/1 |
| 6,438,585 | B2 | 8/2002 | Mousseau et al. | 709/206 |
| 6,701,521 | B1* | 3/2004 | McLlroy et al. | 717/173 |
| 6,789,110 | B1* | 9/2004 | Short et al. | 709/221 |
| 6,961,417 | B2* | 11/2005 | Koch | 379/207.02 |
| 7,080,372 | B1* | 7/2006 | Cole | 717/173 |
| 7,082,549 | B2* | 7/2006 | Rao et al. | 714/6 |
| 7,089,259 | B1* | 8/2006 | Kouznetsov et al. | 707/102 |
| 7,240,102 | B1* | 7/2007 | Kouznetsov et al. | 709/220 |
| 7,310,801 | B2* | 12/2007 | Burkhardt et al. | 717/169 |
| 2001/0029178 | A1 | 10/2001 | Criss et al. | 455/419 |
| 2001/0047363 | A1 | 11/2001 | Peng | 707/104.1 |
| 2001/0048728 | A1 | 12/2001 | Peng | 375/354 |
| 2002/0013831 | A1* | 1/2002 | Astala et al. | 709/220 |
| 2002/0078209 | A1 | 6/2002 | Peng | 709/227 |
| 2002/0107795 | A1* | 8/2002 | Minear et al. | 705/40 |
| 2002/0116261 | A1 | 8/2002 | Moskowitz et al. | 705/14 |
| 2002/0131404 | A1 | 9/2002 | Mehta et al. | 370/352 |
| 2002/0152005 | A1 | 10/2002 | Bagnordi | 700/234 |
| 2002/0156863 | A1 | 10/2002 | Peng | 709/217 |
| 2002/0157090 | A1 | 10/2002 | Anton, Jr. | 717/178 |
| 2002/0166001 | A1* | 11/2002 | Cheng et al. | 710/1 |
| 2003/0033599 | A1 | 2/2003 | Rajaram et al. | 717/173 |
| 2003/0037075 | A1 | 2/2003 | Hannigan et al. | 707/500 |
| 2003/0061384 | A1 | 3/2003 | Nakatani | 709/245 |
| 2004/0026008 | A1* | 2/2004 | Delisle | 156/73.1 |
| 2004/0034850 | A1* | 2/2004 | Burkhardt et al. | 717/120 |
| 2004/0123153 | A1* | 6/2004 | Wright et al. | 713/201 |
| 2004/0205709 | A1* | 10/2004 | Hiltgen et al. | 717/115 |
| 2005/0055595 | A1* | 3/2005 | Frazer et al. | 713/400 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the $1^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

NETWORK FOR LIFECYCLE MANAGEMENT OF FIRMWARE AND SOFTWARE IN ELECTRONIC DEVICES

CROSS-REFERENCE TO RELATED APPLICATIONS

The present application claims the benefit of U.S. Provisional Patent Application Ser. No. 60/472,577, entitled "Network For Lifecycle Management Of Firmware And Software In Electronic Devices", filed May 22, 2003, the complete subject matter of which is hereby incorporated herein by reference in its entirety.

The present application also hereby incorporates herein by reference in its entirety, the complete subject matter of U.S. Provisional Patent Application 60/428,069, filed Nov. 11, 2002.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices such as mobile phones and personal digital assistants (PDA's) often contain firmware and application software that are either provided by the manufacturers of the electronic devices, by telecommunication carriers, or by third parties. These firmware and application software often contain software bugs. New versions of the firmware and software are periodically released to fix the bugs, to introduce new features, or both.

Electronic devices, such as mobile handsets, access servers to retrieve update packages that are needed to update firmware and/or software. When thousands of mobile handsets simultaneously attempt to access the servers, some of them may not be able to get connected. There is a need for wireless networks to determine if individual mobile handsets can be updated. There is a need for wireless networks to facilitate downloading of update packages by mobile handsets.

Creating efficient and compact update packages for firmware/software updates is a big challenge. Managing update packages efficiently in a carrier network is also a great challenge. Managing the lifecycle of firmware and software in electronic devices, such as mobile handsets, is a complicated and important task.

Further limitations and disadvantages of conventional and traditional approaches will become apparent to one of ordinary skill in the art through comparison of such systems with the present invention as set forth in the remainder of the present application with reference to the drawings.

SUMMARY OF THE INVENTION

Aspects of the present invention may be found in a carrier network supporting lifecycle management of update packages for updating at least one of firmware and software in a plurality of electronic devices. A carrier network in accordance with the present invention may comprise at least one server comprising software capable of managing lifecycle information associating at least one of a firmware and software version with at least one of the plurality of electronic devices. Such an embodiment may also comprise storage software for managing the storage of update packages, and server software supporting the delivery of stored update packages to at least one of the plurality of electronic devices via a communication network, based upon the lifecycle information. The update packages may comprise a set of executable instructions for converting in the at least one of the plurality of electronic devices a first version of at least one of firmware and software to a second version.

An embodiment of the present invention may also comprise diagnostics software capable of collecting and analyzing information associated with the carrier network, and software supporting at least one of billing and provisioning for the carrier network. Such an embodiment may further comprise software supporting a management console providing a user interface for communicating lifecycle management information. The lifecycle management information may be communicated using an Internet protocol, where the Internet protocol may comprise at least one of hypertext markup language (HTML), extensible markup language (XML), and hypertext transfer protocol (HTTP). The communication network may comprise a wireless network, and the wireless network may comprise a cellular telephone network. In an embodiment in accordance with the present invention, the plurality of electronic devices may comprise at least one of a mobile handset, a cellular telephone, a pager, a personal digital assistant, and a personal computer. Each of the plurality of electronic devices may comprise download software for receiving an update package, and at least one update agent capable of updating at least one of firmware and software using the received update package. Each of the plurality of electronic devices may comprise firmware capable of authenticating a received update package. In various embodiments of the present invention, the lifecycle management information may comprise at least one of update delivery information, user information, subscriber information, electronic device information, and update package information.

Additional aspects of the present invention may be seen in a method of managing, via a communication network, a lifecycle of at least one of software and firmware in a plurality of electronic devices each having associated therewith at least one device characteristic. The method may comprise receiving an update package for updating the at least one of software and firmware in at least a portion of the plurality of electronic devices, and receiving, via a user interface, lifecycle information associating the received update package with the at least a portion of the plurality of electronic devices. The method may also comprise storing the received update package using the lifecycle information. In addition, an embodiment of the present invention may comprise receiving an update package request comprising at least one device characteristic, and transmitting, via the communication network to at least one of the plurality of electronic devices, an update package retrieved using the at least one device characteristic and the lifecycle information.

The communication network in an embodiment of the present invention may comprise a wireless network, and the communication network may comprise a cellular telephone network. In various embodiments of the present invention, the plurality of electronic devices may comprise a mobile handset, a cellular telephone, a pager, a personal digital assistant, and a personal computer. The at least one device characteristic may comprise at least one of firmware version identification information, software version identification information, and operating system information. The at least one device characteristic may also comprise at least one of electronic device information, hardware component identification information, manufacturer identification information, and device model identification information. The update package may comprise a set of executable instructions for converting at least one of software and firmware from a first version to a second version.

In an embodiment in accordance with the present invention, the user interface may be communicated using an Internet protocol, and the Internet protocol may comprise at least one of hypertext markup language (HTML), extensible markup language (XML), and hypertext transfer protocol (HTTP). The update package may be received from one of a manufacturer of at least a portion of the plurality of electronic devices and a third party software developer. An embodiment of the present invention may also comprise updating lifecycle information based upon at least one of receiving an update package, storing the received update package, receiving an update package request, and transmitting a stored update package to an electronic device. The lifecycle information in various embodiments of the present invention may comprise at least one of update delivery information, user information, subscriber information, electronic device information, and update package information.

Still other aspects of the present invention may be observed in a system for managing lifecycle information for a plurality of wireless mobile devices. Such a system may comprise at least one processor capable of storing one or more update package for updating at least one of software and firmware in a plurality of wireless mobile devices. The at least one processor may be capable of receiving an update request, and of retrieving one of the one or more update packages, based upon the received update request and lifecycle information. In an embodiment of the present invention, the at least one processor may be capable of delivering the retrieved one of the one or more update packages via a wireless communication network, and of modifying the lifecycle information based upon at least one of the storing, receiving, retrieving, and delivering. The plurality of wireless mobile devices may comprise at least one of a mobile handset, a cellular telephone, a pager, a personal digital assistant, and a personal computer, and the one or more update packages may comprise a set of executable instructions for converting a first version of at least one of software and firmware to a second version. Lifecycle information in an embodiment of the present invention may comprise at least one of update delivery information, user information, subscriber information, wireless mobile device information, and update package information.

DETAILED DESCRIPTION OF THE INVENTION

Figure 1:
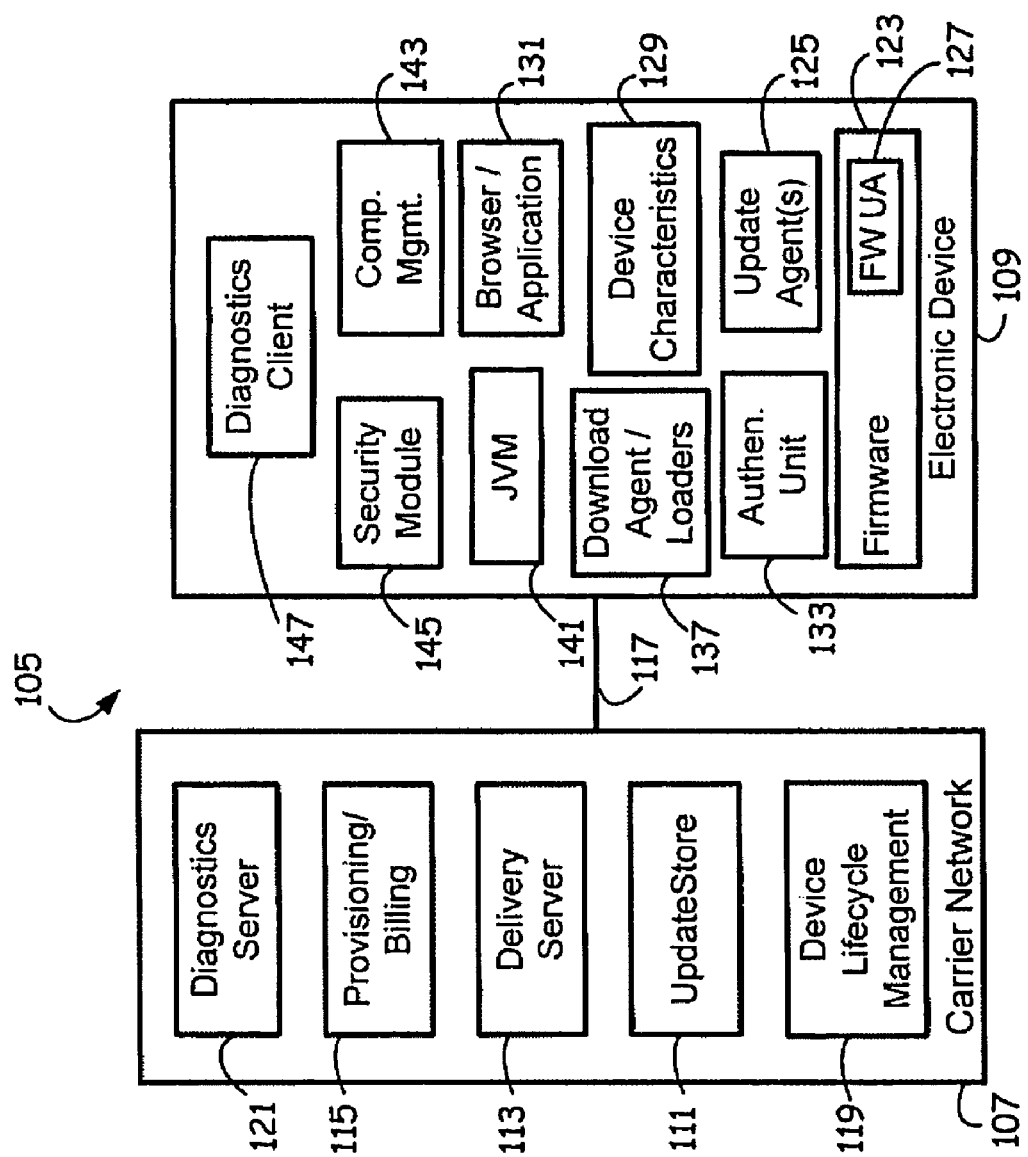
FIG. 1 is a block diagram illustrating an exemplary network for lifecycle management of firmware and software applications in electronic devices according to an embodiment of the present invention.

Aspects of the present invention may be found in a method of updating firmware/software components in electronic devices. More specifically, aspects of the present invention relate to the life cycle management of firmware and software in electronic devices such as, for example, mobile handsets, cellular telephones, personal digital assistants, pagers, personal computers, etc.

In an embodiment according to the present invention, firmware may be considered software placed in a read-only memory device in an embedded system in an electronic device. Firmware may also comprise software necessary to boot, initialize, and run the embedded systemware.

In an embodiment according to the present invention, flash memory may be a memory resource re-programmable or writeable in the field, for example. Flash memory has many characteristics that make it distinct from other types of memory. Flash memory may also be used as read-only memory.

In an embodiment according to the present invention, a software/firmware version may be defined as identification information associated with a firmware image or software application. The identification information may be numeric, such as, for example, version 1, version 2, version 2.2, version 3a, etc., but may also be textually descriptive.

In an embodiment according to the present invention, a simple network management protocol (SNMP) may be defined as a set of specifications standardizing the way hardware, firmware, and software processes are managed and monitored over the network. One example of an SNMP may be found in RFC 1157, dated May/1990, entitled "A simple network management protocol" by Internet Engineering Task Force.

In an embodiment according to the present invention, an SNMP agent may process electronic device and network component interfaces with a managed resource wherein the managed resource is adapted to respond to requests from an SNMP Manager and send tracking/event notifications.

In an embodiment according to the present invention, a Java 2 Enterprise Edition (J2EE) environment, developed by Sun Microsystems, may be adapted to provide a set of features for software/firmware developers, including object oriented messaging, web services, database access, and database management. J2EE application servers may also store applications written within the J2EE framework.

In an embodiment according to the present invention, Java Data-Base Connectivity (JDBC) may be defined as a J2EE application program interface (API) adapted to provide access to databases from a plurality of application vendors.

In an embodiment according to the present invention, an update package may be defined as a collection of data/meta-data and update/upgrade instructions that when bundled and delivered to an electronic device update agent are adapted to facilitate firmware/software updates in the electronic devices. The data/meta-data may include information associated with loading update(s)/upgrade(s) and verifying the contents of the update(s)/upgrade(s) and associated instructions. The update/upgrade instructions may comprise a list of program changes facilitating migration from one version of electronic device firmware to another.

In an embodiment according to the present invention, a SNMP manager may be defined as software which may be installed in console form and may be usable to query managed objects from a SNMP agent.

In an embodiment according to the present invention, a management information base (MIB) may be defined as a component of a SNMP manager adapted to refer to collection(s) of managed objects residing in a virtual information store.

In an embodiment according to the present invention, a structure of management information (SMI) may be defined as a component of the SNMP manager adapted to refer to the programming structure being applied to describe and name software/firmware objects.

FIG. 1 is a block diagram illustrating an exemplary network for lifecycle management of firmware and software applications in electronic devices according to an embodiment of the present invention. FIG. 1 illustrates an exemplary electronic device network 105 comprising a carrier network 107 communicatively coupled to an electronic device 109 via communication link 117. Although a single electronic device 109 is illustrated in FIG. 1, a plurality of electronic devices may be communicatively coupled to the carrier network 107. Electronic device 109, for example, may comprise a mobile handset, a cellular telephone, a personal digital assistant, a pager, a personal computer, etc. The communication link 117 may be via a wire or wirelessly. The carrier network 107 may comprise a diagnostics server 121, a provisioning/billing server 115, a delivery server 113, an update store server 111, and a device lifecycle management server 119.

The diagnostics server 121 may be used to collect and analyze diagnostic information. The delivery server 113 may be adapted to dispense update packages to electronic device 109. The update store server 111 may be used as a repository of update packages, associated update package files, and a database comprising a plurality of logs storing lifecycle management information associated with stored update packages.

In an embodiment according to the present invention, an update package may comprise, for example, a set of executable instructions for converting/updating/upgrading a firmware/software embedded in an electronic device. The network 105, as illustrated in FIG. 1, may also manage a plurality of configuration parameters associated with firmware/software executed in the electronic device 109 and dispense update packages to the electronic device 109. Electronic device 109 may employ one or more update agent(s) 125 managing updates of software/firmware therein.

As illustrated in FIG. 1, electronic device 109 may comprise firmware 123, a firmware update agent 127, one or more update agent(s) 125, an authentication unit 133, and device characteristics 129. The one or more update agent(s) 125 may also be adapted to update the operating system and operating system components, software application components, software/firmware configuration parameters, and/or combinations thereof. Device characteristics component 129 may comprise electronic device information, such as for example, manufacturer identification information, model identification information, firmware version identification information, software version(s) identification information, hardware component identification information, operating system information, etc., of electronic device 109

As illustrated in FIG. 1, electronic device 109 may also comprise a download agent/loaders component 137, a Java virtual machine (JVM) 141, a browser/application component 131, a security module 145, a component management module 143, and a diagnostics client module 147. The download agent/loaders component 137 may be adapted to download firmware/software updates, configuration parameters, etc. The security module 145 may be adapted to store and manage security information corresponding to various segments of non-volatile memory in the electronic device 109. The security module 145 may also be capable of supporting access to various other applications of the electronic device 109. The security module 145 may also support encryption/decryption and management of usernames and passwords in the electronic device 109.

In an embodiment according to the present invention, the component management module 143 may be adapted to manage existing firmware/software components and additional new software components installed upon the electronic device 109. The component management module 143 may be adapted to facilitate license management, installation, update, upgrade, and removal of software components, software applications, etc. The component management module 143 may also be adapted to employ device characteristics module 129 and authentication unit 133 during software component retrieval and/or associated update package retrieval from the carrier network 107. In an embodiment according to the present invention, authentication unit 133 may support at least one authentication technique.

In an embodiment according to the present invention, download agent/loaders component 137 may retrieve information such as, for example, update packages, configuration parameters, and user data from servers in the carrier network 107. Browser/applications component 131 may also be adapted to download data and/or software components, etc. from the plurality of servers in the carrier network 107. In an embodiment according to the present invention, download agent/loaders component 137 may be adapted to upload data, and backup software and diagnostic information collected by the diagnostics client 147, etc.

In an embodiment according to the present invention, update agent(s) 125 may be adapted to replace JVM 141 by performing the functions associated with JVM 141. In another embodiment according to the present invention, update agent(s) 125 may also be adapted to update JVM 141 from one version to another.

The diagnostics client 147, in an embodiment according to the present invention, may be adapted to collect electronic device and electronic device component performance-related data/information by monitoring, tracking and evaluating events in the electronic device 109. Performance-related data/information may comprise performance of radio frequency (RF) communications, performance of baseband communications, software application(s) performance, error statistics, exceptions, frequency of errors and exceptions, etc. In an embodiment according to the present invention, diagnostics client 147 may also be adapted to monitor electronic device events and report/communicate the events and corresponding event frequency to the carrier network 107.

In an embodiment according to the present invention, the diagnostic client 147 may also be adapted to collect and communicate configuration parameters to an appropriate server in the carrier network 107, which may, for example, be diagnostic server 121 or delivery server 111. Collecting configuration parameters may be initiated via an appropriate request from a server in the carrier network 107, such as diagnostic server 121 or delivery server 113. Collecting configuration parameters may also be initiated by the diagnostics client 147 and/or download agent/loaders component 137 in the electronic device, for example.

In an embodiment according to the present invention, the diagnostic client 147 may collect and communicate information on errors, exceptions, and problems in the electronic device 109 to carrier network servers, such as for example, diagnostics server 121, device lifecycle management server 119, delivery server 113, etc., for processing and determinative evaluation.

In an embodiment according to the present invention, the update agent(s) 125 and the firmware update agent 127 may be adapted to employ block-by-block update techniques when updating firmware/software in a fault-tolerant mode in the electronic device 109.

Device lifecycle management server 119, in an embodiment according to the present invention, may be adapted to manage and configure the capabilities of the carrier network 107 and the electronic device 109 communicating therewith. The device lifecycle management server 119 may retrieve capability information, initiate transfer of update packages from update store server 111, retrieve changed configuration parameters, changed provisioning protocols, changed billing information, etc., from the provisioning and billing server 115 in the carrier network 107, and deliver the information and changes to the electronic device 109.

In an embodiment according to the present invention, retrieved capability information may comprise numbers or codes identifying capability parameters of the electronic device 109. In an embodiment according to the present invention, retrieved capability information may also comprise lists of services subscribed to by an end-user of the electronic device 109. In an embodiment according to the present invention, retrieved capability information may also comprise the amount of available memory, power level, signal strength, etc., associated with the electronic device.

The offline functionality of the electronic device 109 is an important consideration because wireless services are often narrowband and subject to fading and congestion. To support offline use of the electronic device 109, end-users may choose to back up and remotely erase data stored on the electronic device 109, for example, if the electronic device 109 is lost, stolen, or misplaced.

In an embodiment according to the present invention, download agent/loaders component 137 may be adapted to upload end-user data and/or end-user content stored on the electronic device 109 to at least one of the plurality of servers in the carrier network 107 for backup and/or safe keeping. The uploaded data/information may be uploaded to the device lifecycle management server 119, for example. The uploaded data/information may subsequently be downloaded/loaded into the electronic device 109 from device lifecycle management server 119 during a recovery of the electronic device.

In an embodiment according to the present invention, update agent(s) 125 may be adapted to remotely erase end-user data/information stored in the electronic device 109 when the electronic device 109 is lost, stolen, or misplaced.

In an embodiment according to the present invention, security module 145 may be adapted to disable the electronic device 109 upon command from at least one of the servers in carrier network 107 such as, for example, the provisioning/billing server 115. Security module 145 may subsequently enable use of the electronic device 109, if the end-user provides valid responses to security prompts and challenges presented by security module 145.

In an embodiment according to the present invention, electronic device 109 may be remotely locked by at least one of the servers in the carrier network 107 when, for example, the provisioning/billing server 115 determines that payment for services is overdue, or when the device lifecycle management server 119 determines that the electronic device 109 may not be used on the carrier network 107 until updated to a different configuration or different version of firmware.

The electronic device 109 may be adapted to compress data/information in order to back-up data/information incrementally at the device lifecycle management server 119 or diagnostics server 121. The data/information stored on the electronic device 109 may not be transferable all at once when a backup is undertaken and may be transferred in a plurality of data packets or files.

In an embodiment according to the present invention, the device lifecycle management server 119 may be adapted to maintain a software inventory of software components available in the electronic device 109. The software inventory may be maintained at provisioning/billing server 115. The device lifecycle management server 119 may be adapted to access the software inventory information.

The provisioning/billing server 115 may be adapted to initiate provisioning of new software applications and end-user services in the electronic device 109. Provisioning may be facilitated by delivery server 113, while downloading of configuration parameters and software/firmware may be facilitated by download agent/loaders component 137. Updating firmware components may be facilitated by firmware update agent 123 and updating software components may be facilitated by update agent(s) 125.

In an embodiment according to the present invention, updating operating system components may also be facilitated by a first update agent 125 and updating software application components may be facilitated by a second or the first update agent 125.

In an embodiment according to the present invention, the backed-up information stored on the electronic device 109 may be accessible by download agent/loaders component 137 and/or browser/application component 131.

In an embodiment according to the present invention, locking electronic device 109, for instances when the electronic device is lost or stolen, may be accomplished by erasing data/information (e.g., user's personal data located in an end-user data segment of the electronic device) and/or by disabling an end-user interface.

In an embodiment according to the present invention, initiation and management of routine and/or critical software/firmware maintenance in electronic device 109 may be conducted by diagnostics client 147 and/or component management module 143.

In an embodiment according to the present invention, electronic device 109 may be a mobile handset capable of operating in a wireless carrier network 107. The mobile handset may comprise firmware 123 and a firmware update agent 127 for updating the firmware 123, an update agent 125 for updating software components such as, for example, JVM 141, and additional update agent(s) 125 for updating operating system components, for example.

In an embodiment according to the present invention, delivery server 113 and update store server 111 may be located in a network server component. In an embodiment according to the present invention, functionality of update store server 111 and device lifecycle management server 119 may also be combined in one network server component. Other combinations of network server-side functionality within carrier network 107 are also contemplated.

The wireless electronic device network 105 may also be capable of managing configuration parameters in a plurality of electronic devices such as, for example, electronic device 109. In an embodiment according to the present invention, firmware/software lifecycle management, for example, may be provided by the wireless electronic device network 105. Firmware/software lifecycle management may comprise, for example, firmware and software downloading, firmware and software updating, associated update file uploading and downloading, remote locking and enabling of the electronic device 109 capability, etc. Update store server 111 in the wireless electronic device network 105 may be adapted to dispense update packages to the electronic device 109. The electronic device 109 may employ update agent(s) 125 to update software and a firmware update agent 127 to update firmware 123.

In an embodiment according to the present invention, electronic device 109 may comprise, for example, a mobile handset, such as, a cellular phone. The cellular phone may be adapted to update firmware and software components embedded therein. The cellular phone may also be adapted to perform diagnostic operations and communicate diagnostic information to carrier network 107 for collection of diagnostic statistics in diagnostics server 121. Diagnostics communications may be evaluated in the carrier network 107 to determine appropriate update packages for installation in the cellular phone to fix bugs, change device configuration, and improve device performance.

Figure 2:
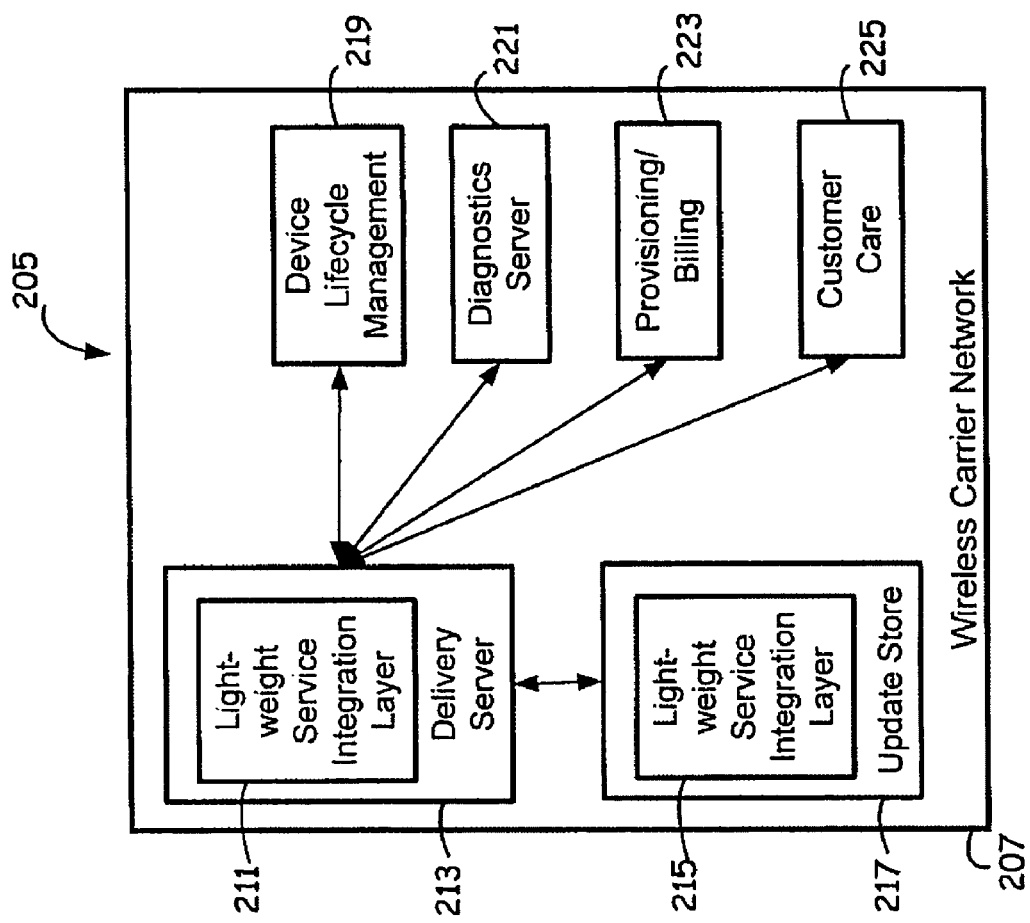
FIG. 2 is a block diagram illustrating an exemplary wireless carrier network facilitating lifecycle management of firmware and software in electronic devices according to an embodiment of the present invention.

FIG. 2 is a block diagram illustrating an exemplary wireless carrier network 205 facilitating lifecycle management of firmware and software in electronic devices according to an embodiment of the present invention. FIG. 2 illustrates an exemplary wireless carrier network 205, in accordance with an embodiment of the present invention. The wireless carrier network 205 may be adapted to facilitate lifecycle management of firmware and software in electronic devices by employing light-weight service integration layers 211, 215 in delivery server 213 and update store server 217, respectively. The light-weight service integration layers 211, 215 may be adapted to integrate different service features providing lifecycle management services.

The wireless carrier network 205 may make available service features supported by device lifecycle management server 219, diagnostics server 221, provisioning/billing server 223, and customer care server 225, via the light-weight service integration layers 211, 215. For example, the light-weight service integration layers 211, 215 may be employed by the delivery server 213 and the update store server 217, respectively, in accessing services provided by device lifecycle management server 219, diagnostics server 221, provisioning/billing server 223, and customer care server 225.

In an embodiment according to the present invention, the light-weight service integration layers 211, 215 may provide simple object access protocol (SOAP) and extensible markup language (XML)-based connectivity to the service features (service interface) supported by the device lifecycle management server 219, the diagnostics server 221, the provisioning/billing server 223, and the customer care server 225. The light-weight service integration layers 211, 215 may provide an XML and hypertext transfer protocol (http)-based interface to functions or commands provided by the device lifecycle management server 219, the diagnostics server 221, the provisioning/billing server 223, and the customer care server 225.

In an embodiment according to the present invention, specific functions and/or commands provided by, for example, the delivery server 213 or the update store server 217 may be translated into a sequence of interactions (SOAP or http-based). These interactions may be with one or more additional servers such as, for example, device lifecycle management server 219, the diagnostics server 221, the provisioning/billing server 223, and the customer care server 225.

Figure 3:
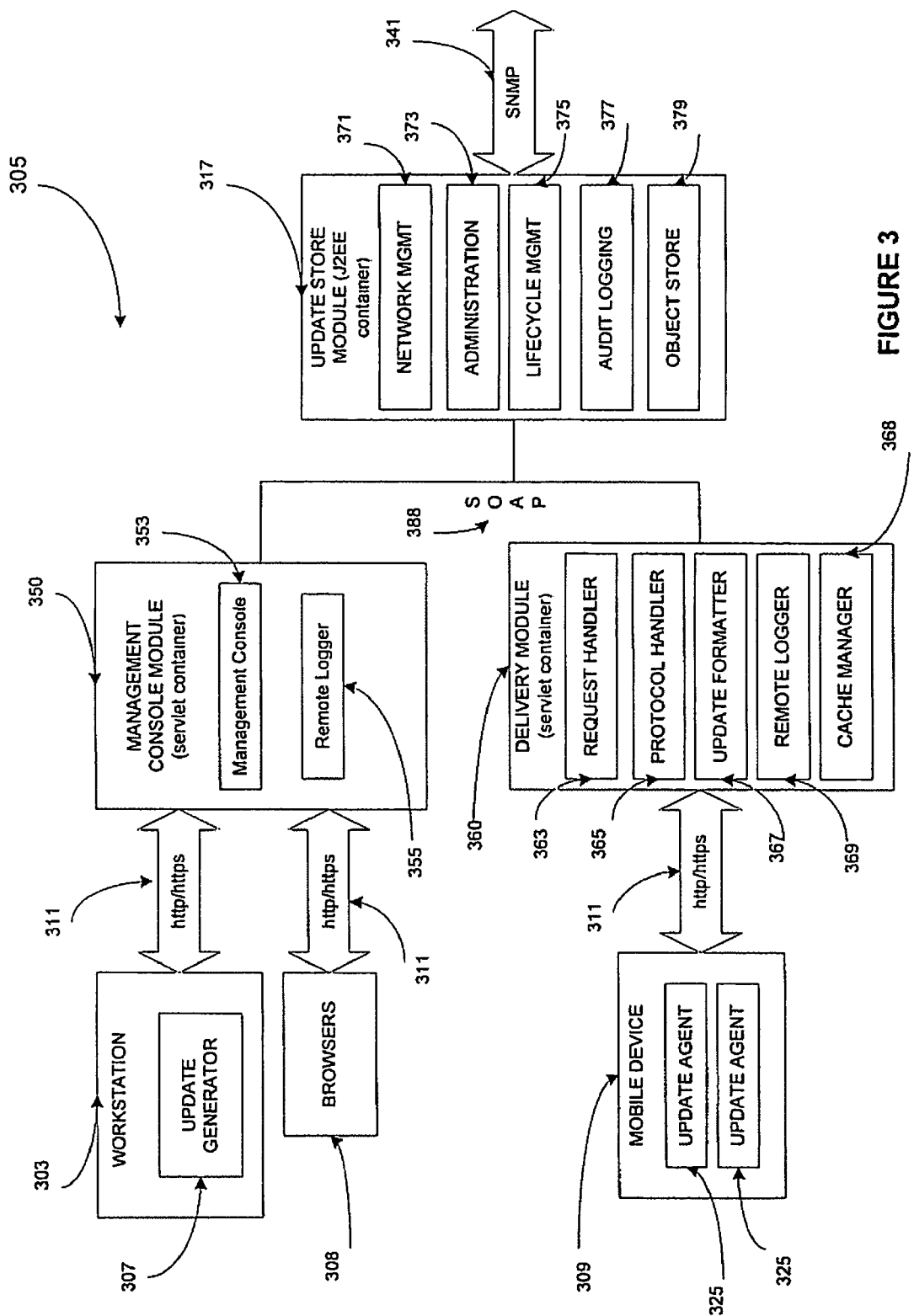
FIG. 3 is a block diagram illustrating an exemplary server deployment system according to an embodiment of the present invention.

An update management system for electronic devices in an electronic device network, according to an embodiment of the present invention, may comprise an update store server 217. The update store server 217 may be adapted to store, manage, and distribute user-defined-rules, update packages, and associated update package files. The update store server 217 may be managed via a user friendly, web-based interface through a management console module. In addition to update package management related tasks, the update store server 217 may be adapted to facilitate user management, transition logging, audit logging, system logging, and system administration features in a carrier network server component, as illustrated in FIG. 2. The update store server 217 may also be a part of the update management system. The locations of where the modules may logically be deployed is illustrated in FIG. 3, as described below. For example, a plurality of update store modules may reside in a J2EE application server in a single computer, or the modules may be deployed in hardware of a respective electronic device.

FIG. 3 is a block diagram illustrating an exemplary server deployment system 305 according to an embodiment of the present invention. FIG. 3 illustrates where the system modules may logically be deployed. A plurality of update store modules, for example, update store module 317, may reside in a J2EE (container) application server in a single computer, or the update store modules may be deployed in the hardware of a respective electronic device. The update store module 317 may comprise an administration module 373, a network management module 371, a lifecycle management module 375, an audit logging module 377, and an object store module 379. The update store module 317 may use the simple object access protocol 1.1 (SOAP 1.1) 388 to interface with other system components. Additionally, the update store module 317 may also follow the SNMP standards 341 for system management of configurations and alarms, and for interfacing with additional system components.

The update store module 317 may be implemented using the Java 2 Enterprise Edition (J2EE) and/or other server-side frameworks, for example:

J2EE framework may comprise Enterprise Java Beans 1.1 (EJB 1.1), a Java applet that runs within a web server environment, such as, servlet 2.3, Java Server Pages 1.1 (JSP 1.1), Java Database Connectivity 2.0 (JDBC 2.0), Java API for XML Processing 1.2 (JAXP 1.2), Java Message Service API 1.1 (JMS 1.1), and Java Server Faces 1.0 (JSF 1.0);

Javasoft Extensions (JAVAX) such as Java Data Objects 1.0 (JDO 1.0), Java management Extensions 1.0 (JMX 1.0), and Java Secure Socket Extension (JSSE);

Apache Jakarta Project such as Struts, and log4J debugging tools, and other Apache Projects such as Xerces, Xalan, and Ant; and other frameworks such as Java document object model (JDOM), a Java-based solution for accessing, manipulating and outputting extensible markup language (XML), and generic language universal environment (GLUE).

The update store module 317 may be extensible through interfaces by leveraging server-side application frameworks. Additionally, services provided by the update store module 317 may apply industry standard interfaces to maximize the ease of integration into/between existing systems and third-party systems. The update store module 317 may also support the SOAP 1.1 protocol 388 as a remote procedure call interface for public system services.

The user interfaces to the update store module 317 may be managed by a management console module 350 comprising a management console 353. The management console module 350 may also comprise a remote logger 355 for monitoring and logging electronic device activity and network activity. The update store module 317 may be adapted to determine an update package for a particular electronic device, for example, mobile device 309, based upon a lifecycle management process. The electronic devices, such as for example, mobile device 309 may comprise a plurality of update agents 325 facilitating update package retrieval, parsing, processing, etc.

The update management system 305 may be scalable in order to support hundreds to thousands or millions of electronic devices, such as mobile device 309, for example. In a high-volume production environment, delivery modules, such as delivery module 360, may be adapted to be session-clustered to handle update package requests and responses from the numerous electronic devices, such as, mobile device 309. Behind the delivery modules, such as delivery module 360, may be another cluster of update store modules, such as, update store module 317. By using J2EE containers and network load balancing solutions, both the delivery module 360 and update store module 317, or clusters thereof, may be adapted to provide both fault-tolerant operation modes and scalable performance.

The update store module 317 may offer a plurality of security mechanisms to protect electronic device components and leverage the application servers' runtime security policies. The update store module 317 may also support basic authentication and encryption passwords.

For example, the management console 353, a component of management console module 350, may require a valid pair of a username and a password to access a particular application. Definition and management of usernames and passwords may be managed through management console 353. The only interface that may involve further access control is the Update Store. The customer may be expected to setup an LDAP repository that will control access to the Update Store. This access control may apply to users of the Management Console, users of the Generator when attempting to communicate with the Application Server, and anyone that directly accesses the Update Store. The update store module 317 may comprise a license key that may be used during software/firmware installation. The installing server device may also require a valid license key before installation can take place.

When discussing the security of the update store module 317, three types of security may be examined.

To secure a channel, the update generator 307 deployed in a workstation 303 or other network device and/or browser(s) 308 may be adapted to use a secure socket layer (SSL) to encrypt server communication. The SSL protocol may provide verification of update store module 317 server identity and integrity of exchanged conversations from modification and interception. The workstation 303 and/or browsers 308 may be adapted to communicate with the management console module 350, and the rest of the electronic device network 305 via hyper text transfer protocol(s) (http) 311. Http is the protocol used for moving hypertext files across the Internet. Http requires a http client program on one end and an http server program on the other end of a communication link.

Similarly, SSL may be used for communications between the delivery module 360, or cluster thereof, and the update store module 317, or cluster thereof. The delivery module 360 may comprise a request handler module 363, a protocol handler module 365, an update formatter module 367, a remote logger module 369, and a cache manager module 368. Additional security mechanisms may also be applied by a networking layer's router or firewall to restrict access to the update store module(s) 317 to a fixed, known, and/or predetermined list of respective delivery module(s) 360.

SSL or other networking security, including a virtual private network (VPN), may be used to ensure valid access to the update store module(s) 317 from third-party delivery/device management servers.

With a distributed solution, the update store module 317 may act as a content server component together with a $3^{rd}$ party device management solution.

Figure 4:
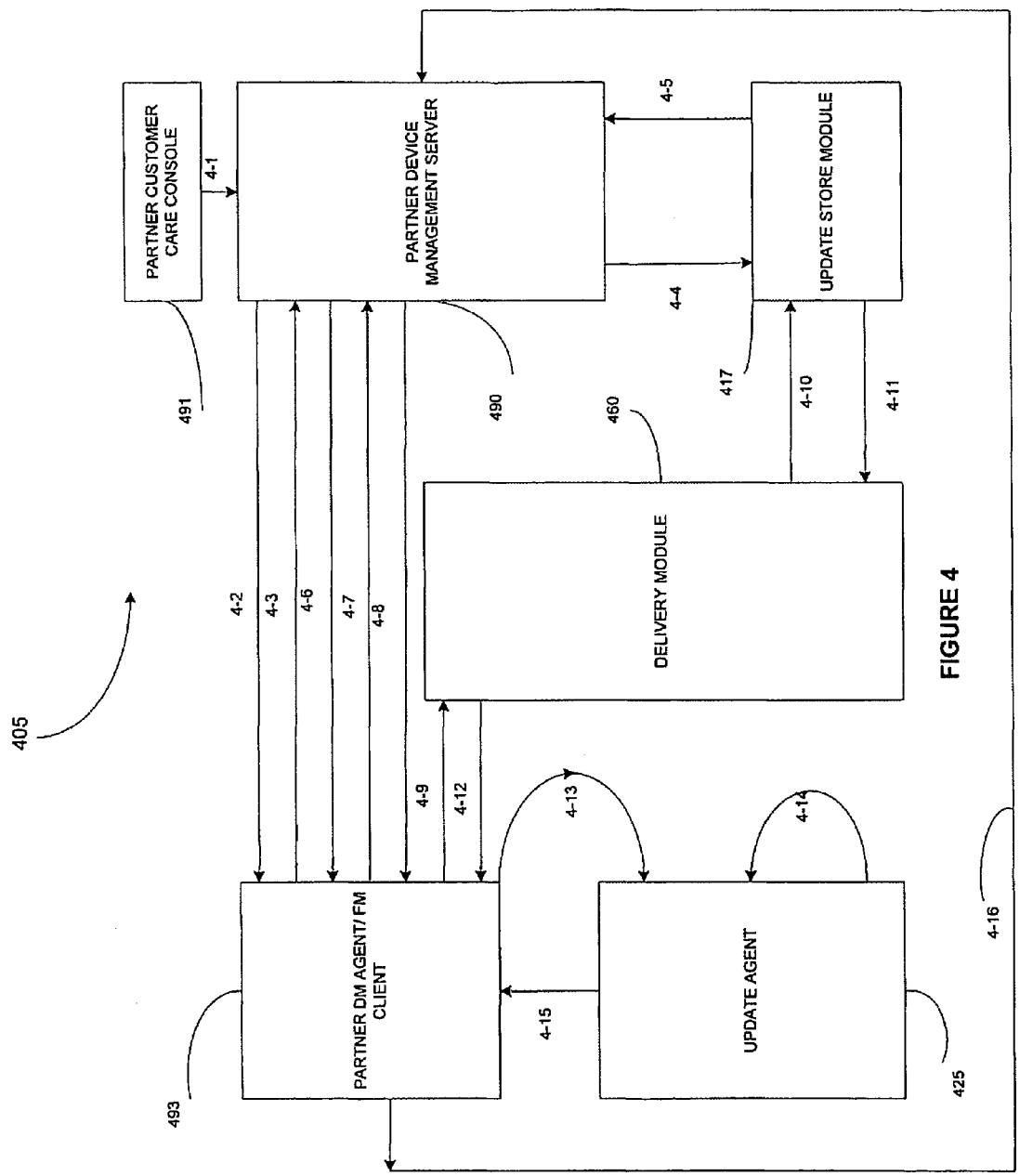
FIG. 4 is flow diagram illustrating an exemplary commercial deployment method for a distributed solution according to an embodiment of the present invention.

FIG. 4 is data flow diagram illustrating an exemplary commercial deployment method 405 for a distributed electronic device network solution according to an embodiment of the present invention. According to an embodiment of the present invention, a partner customer care console (PCCC) 491 may be adapted to send an update notification (4-1) to a partner device management server (PDMS) 490. The PDMS 490 may be adapted to push the update notification (4-2) to the partner DM agent/FM client (PDM/FM) 493. The PDM/FM 493 may be adapted to respond with electronic device profile information and end-user subscriber information (4-3) to the PDMS 490. The PDMS 490 may be adapted to request update package information (4-4) from the update store module 417. The update store module 417 may be adapted to respond to the information request by returning/transmitting the requested update package information (4-5) to the PDMS 490.

The PDMS 490 may be adapted to transmit the update package information (4-6) to the PDM/FM 493 wherein the PDM/FM 493 may be adapted to transmit a confirmation of the update package requested (4-7) associated with the transmitted update package information to the PDMS 490. The PDMS 490 may be adapted to transmit the universal resource locator (URL) (i.e., server location) of the update package (4-8) to the PDM/FM 493.

The PDM/FM 493 may transmit the electronic device profile information (4-9) to the delivery module 460. The delivery module 460 may request the update package (4-10) from the update store module 417, wherein the update store module 417 may respond by transmitting the update package (4-11) to the delivery module 460. The delivery module 460 may download the requested update package (4-12) to the PDM/FM 493.

The PDM/FM 493 may transmit the update package (4-13) whole or in parts to the update agent 425, wherein the update agent 425 may facilitate and perform the update/upgrade (4-14) on the electronic device'(s) software/firmware. The update agent 425 may respond by transmitting confirmation of update package completion (4-15) to the PDM/FM 493. The PDM/FM 493 may transmit a confirmation that the update is complete (4-16) to the PDMS 490.

Exemplary functions of the update store module 417 may be responding to update package information requests using an update package descriptor file (not shown); responding to update package information requests coming from delivery module 460 with an update package; auditing a trail/log consolidator for all of the plurality of delivery module(s) 460; and centralizing management via a management console of a cluster of electronic device components.

Exemplary functions of the delivery module 460 may be scalable deployment via a plurality of delivery module(s) 460 to manage large numbers of update package information requests from a plurality of mobile electronic device clients; retrieving requested update packages from a cache or the update store module 417, delivering update packages to the plurality of client' electronic devices using the appropriate corresponding protocol and data format.

Functions of the $3^{rd}$ party device management server, for example, PDMS 490, may be managing subscriber/device information; initiating (short message service (SMS), wireless application protocol (WAP) push) an update process from a customer care console or batch process; and tracking successful update notification messages.

The embedded solution is different from the distributed solution because the delivery module 460 is embedded in the $3^{rd}$ party device management/delivery server solution.

Figure 5:
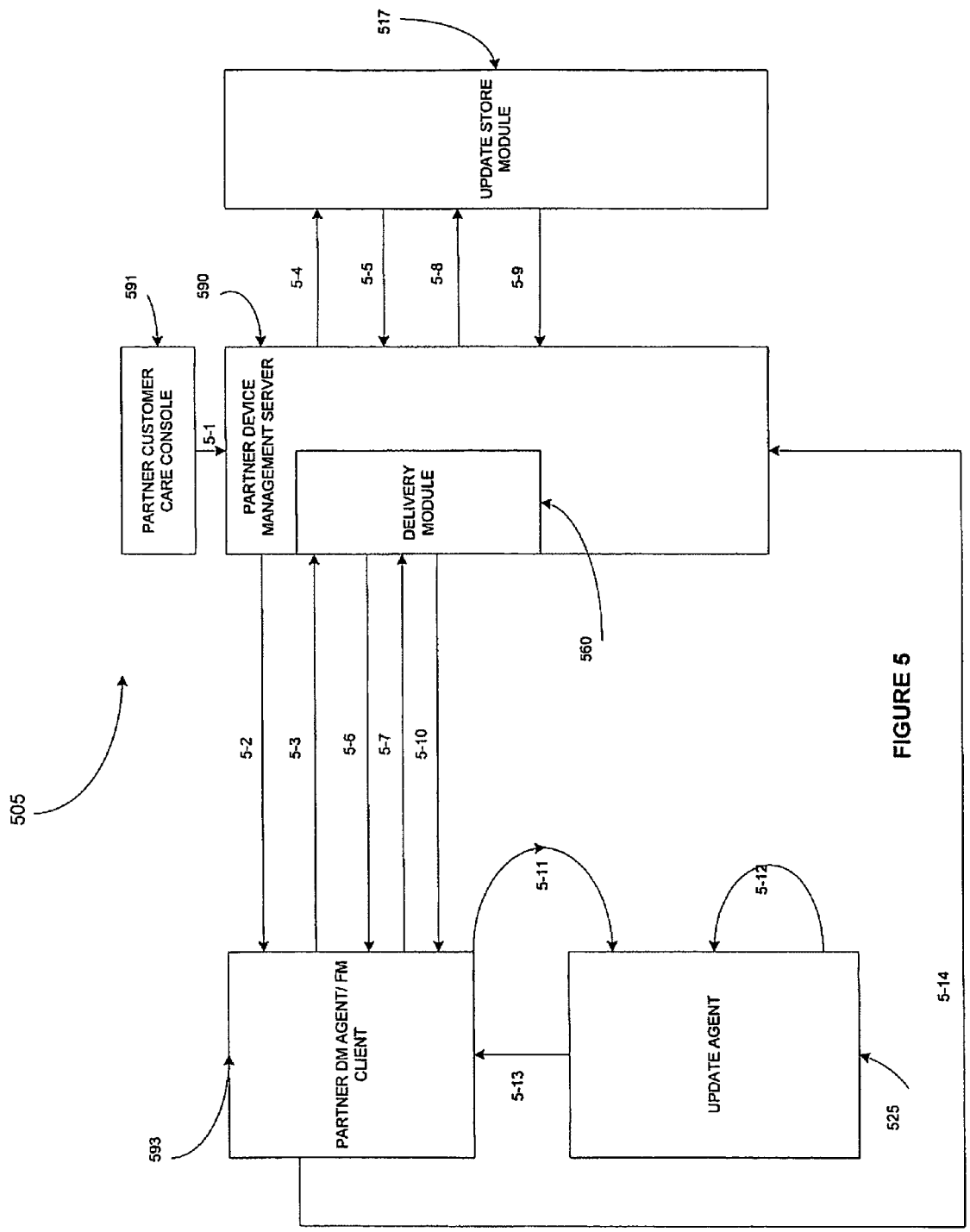
FIG. 5 is a flow diagram illustrating an exemplary commercial deployment method of an embedded solution according to an embodiment of the present invention.

FIG. 5 is a data flow diagram illustrating an exemplary commercial deployment method 505 of an embedded electronic device firmware/software update solution according to an embodiment of the present invention. According to an embodiment of the present invention, a partner customer care console (PCCC) 591 may be adapted to send an update notification (5-1) to a partner device management server (PDMS) 590. The PDMS 590 may be adapted to push the update notification (5-2) to the partner DM agent/FM client (PDM/FM) 593. The PDM/FM 593 may be adapted to respond with electronic device profile information and end-user subscriber information (5-3) to a delivery module 560 embedded in the PDMS 590. The PDMS 590 may be adapted to request update package information (5-4) from the update store module 517. The update store module 517 may be adapted to respond to the information request by returning/transmitting the requested update package information (5-5) to the PDMS 590.

The delivery module 560 embedded in the PDMS 590 may be adapted to transmit the update package information (5-6) to the PDM/FM 593, wherein the PDM/FM 593 may be adapted to transmit a confirmation of the update package requested (5-7) associated with the transmitted update package information to the delivery module 560 embedded in the PDMS 590. The PDMS 590 may request the update package (5-8) from the update store module 517, wherein the update store module 517 may respond by transmitting the update package (5-9) to the PDMS 590. The delivery module 560 embedded in PDMS 590 may download the requested update package (5-10) to the PDM/FM 593.

The PDM/FM 593 may transmit the update package (5-11) in whole or in parts to the update agent 525, wherein the update agent 525 may facilitate and perform the update/upgrade (5-12) on the electronic device'(s) software/firmware. The update agent 525 may respond by transmitting confirmation of update package completion (5-13) to the PDM/FM 593. The PDM/FM 593 may transmit a confirmation that the update is complete (5-14) to the PDMS 590.

Exemplary functions of the update store module 517 may be to respond to a plurality of update package information requests using an update package descriptor file; respond to update package requests; and centralize management via a management console for a cluster of update store module(s) 517.

Functions of the $3^{rd}$ party device management server, for example, PDMS 590, may be managing:
subscriber/device information;

initiating (short message service (SMS), wireless application protocol (WAP) push) the update process from a customer care console, for example, PCCC 591, or a batch process;

handling large numbers of update package requests from a plurality of mobile electronic device clients;

retrieving requested update packages from a cache or the update store module(s) 517;

delivering update package using the appropriate protocol and data format to the plurality of client electronic devices; and tracking successful update notifications.

Figure 6:
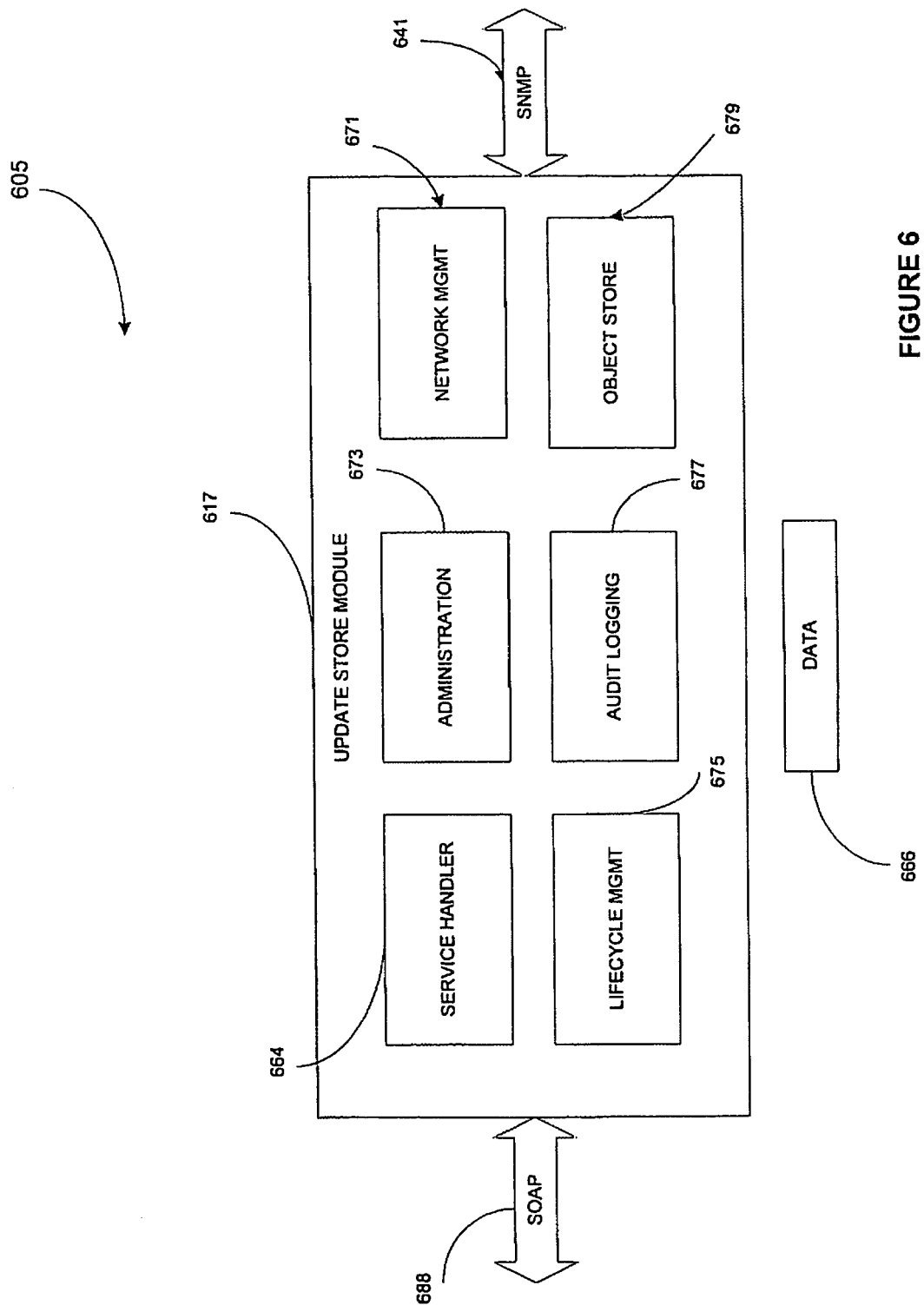
FIG. 6 is a block diagram illustrating a plurality of sub-modules in an exemplary update store module according to an embodiment of the present invention.

FIG. 6 is a block diagram 605 illustrating a plurality of exemplary update store module 617 components according to an embodiment of the present invention.

In order to meet the extensibility needs for the update store module 617, the update store module 617 may be designed to be modular. The update store module 617 according to an embodiment of the present invention may comprise at least the following software components:

a service handler module 664;

simple object access protocol (SOAP) communication layer 688 to handle service requests from the management console, delivery module, and/or 3$^{rd}$ Party software;

a lifecycle management module 675 managing the lifecycle of update packages including subscriber groups;

an administration module 673 managing users, roles, access rights, and download groups;

an audit logging module managing transaction, audit, and system logging activities;

a network management module 671;

a simple network management protocol (SNMP) communication configuration 641 for the update store modules; and an object store module 679 storing object relational mapping and persistence layer information.

The update store module 617 may also have one or a plurality of associated data storage memory device(s) 666, either externally or internally configured therewith.

Figure 7:
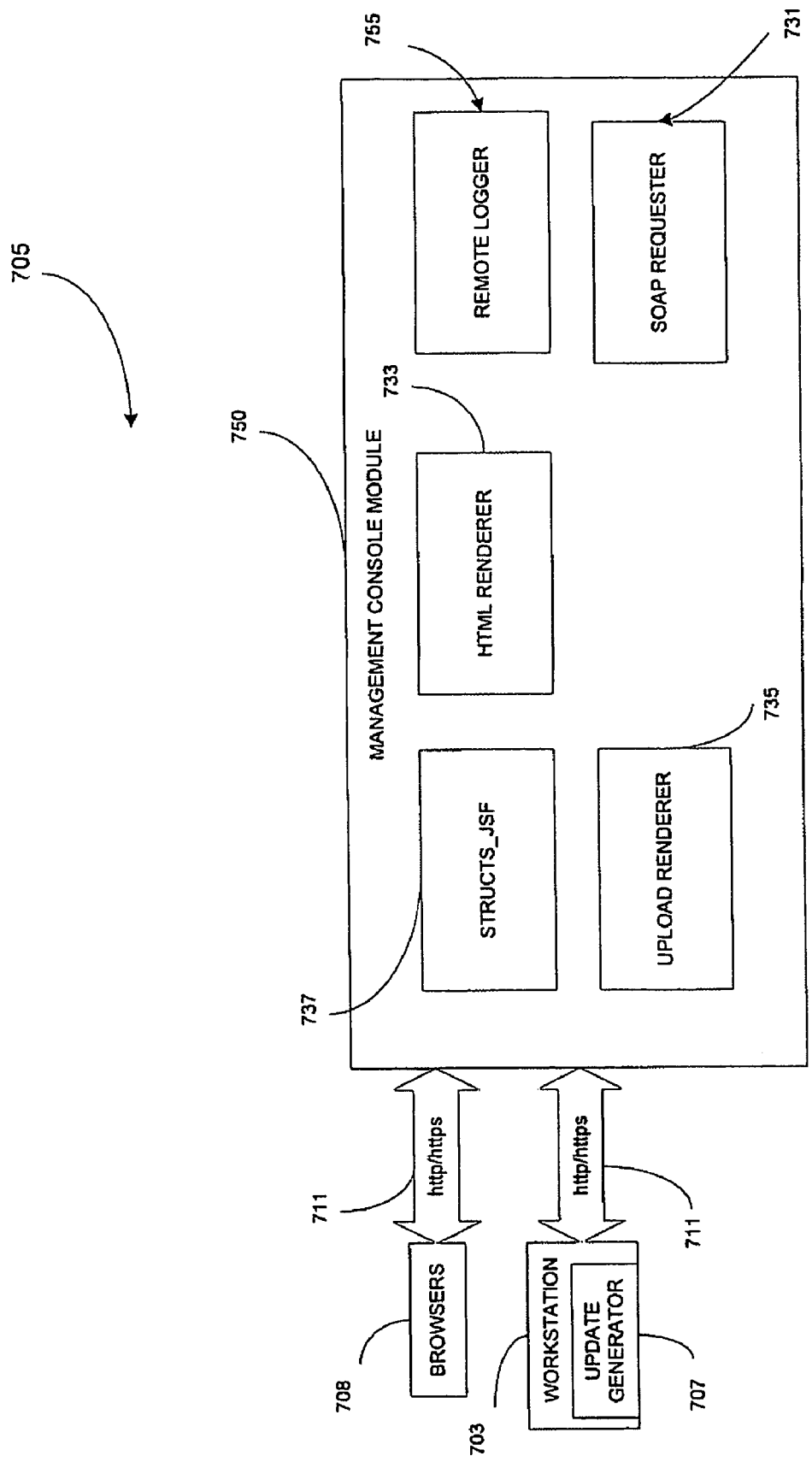
FIG. 7 is a block diagram illustrating an exemplary management console module in an electronic device network according to an embodiment of the present invention.

FIG. 7 is a block diagram 705 illustrating an exemplary management console module 750 according to an embodiment of the present invention. The management console module 750 may comprise a remote logger module 755, a SOAP requester module 731, an html renderer module 733, an upload renderer module 735 and a structs_jsf module 737.

Administrative tasks undertaken during daily operation of the update management system may be done via HTML pages using a web browser with or without secure socket layer (SSL) (56 or 128-bits) encryption. The HTML pages may minimize use of proprietary extensions or tags to ensure compatibility with older browser versions or different browser software.

The management console module 750 may be adapted to communicate with a plurality of browsers 708 and a plurality of workstations 703. The workstations may comprise an update generator 707. The browsers 708 and the workstations may communicate with the management console module via hyper text transfer protocol(s) (http/https) 711. Http is the protocol used for moving hypertext files across the Internet, for example. Http ordinarily requires a http client program on one end and an http server program on the other end of a communication link. The management console module may be a web application running in a servlet container.

Figure 8:
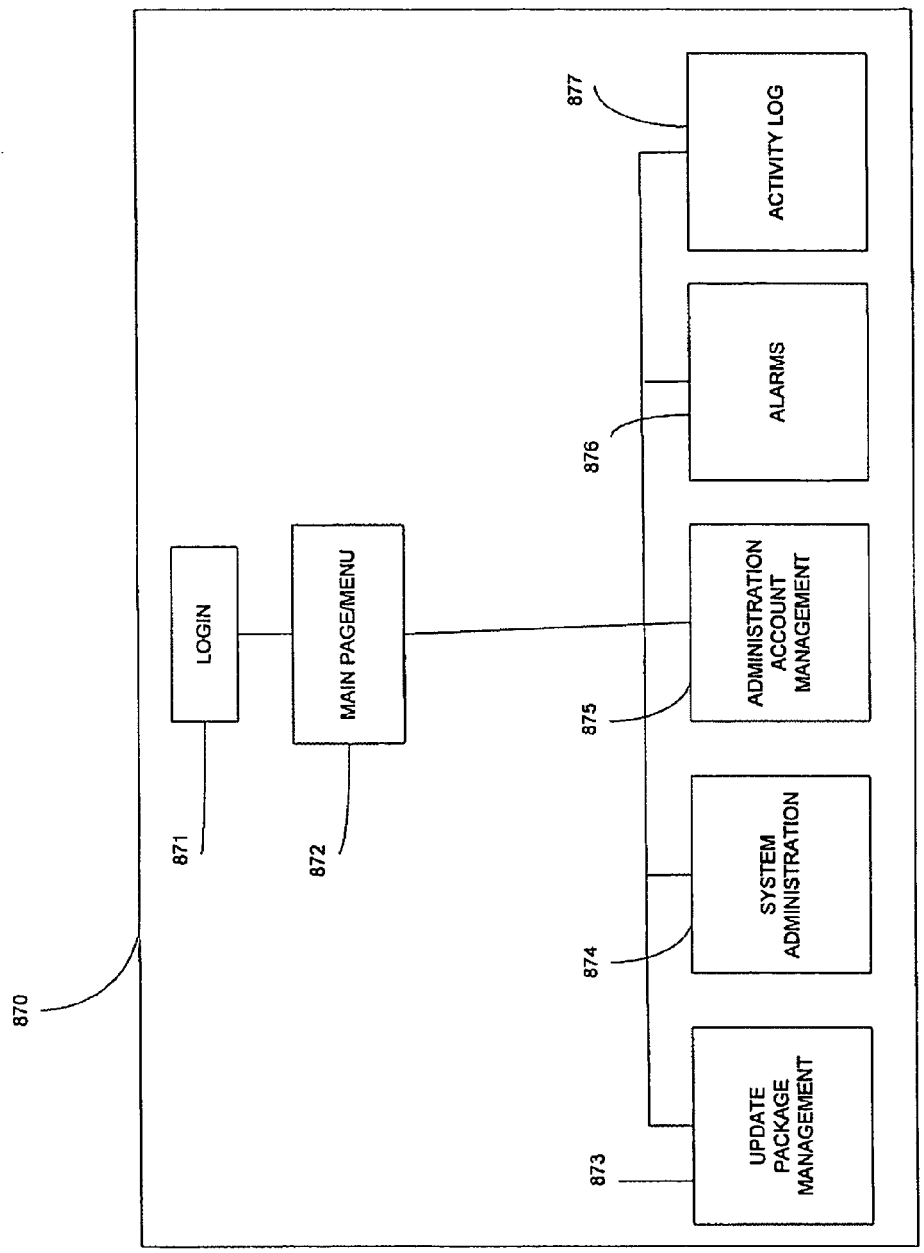
FIG. 8 is a block diagram illustrating an exemplary site structure in an electronic device network according to an embodiment of the present invention.

FIG. 8 is a block diagram 805 illustrating an exemplary site structure 870 in an electronic device network according to an embodiment of the present invention. The site structure 870 may comprise a login screen 871 where a user name and password may be entered permitting access to the rest of the site. The site structure 870 may also comprise a main page/menu screen 872. The main page/menu screen 872 may provide a portal to a plurality of other information screens such as, for example, an update package management screen 873, a system administration screen, 874, an administration account management screen 875, an alarms screen 876, and an activity log screen 877. The above screens are exemplary and additional and other screens may be provided.

Figure 9:
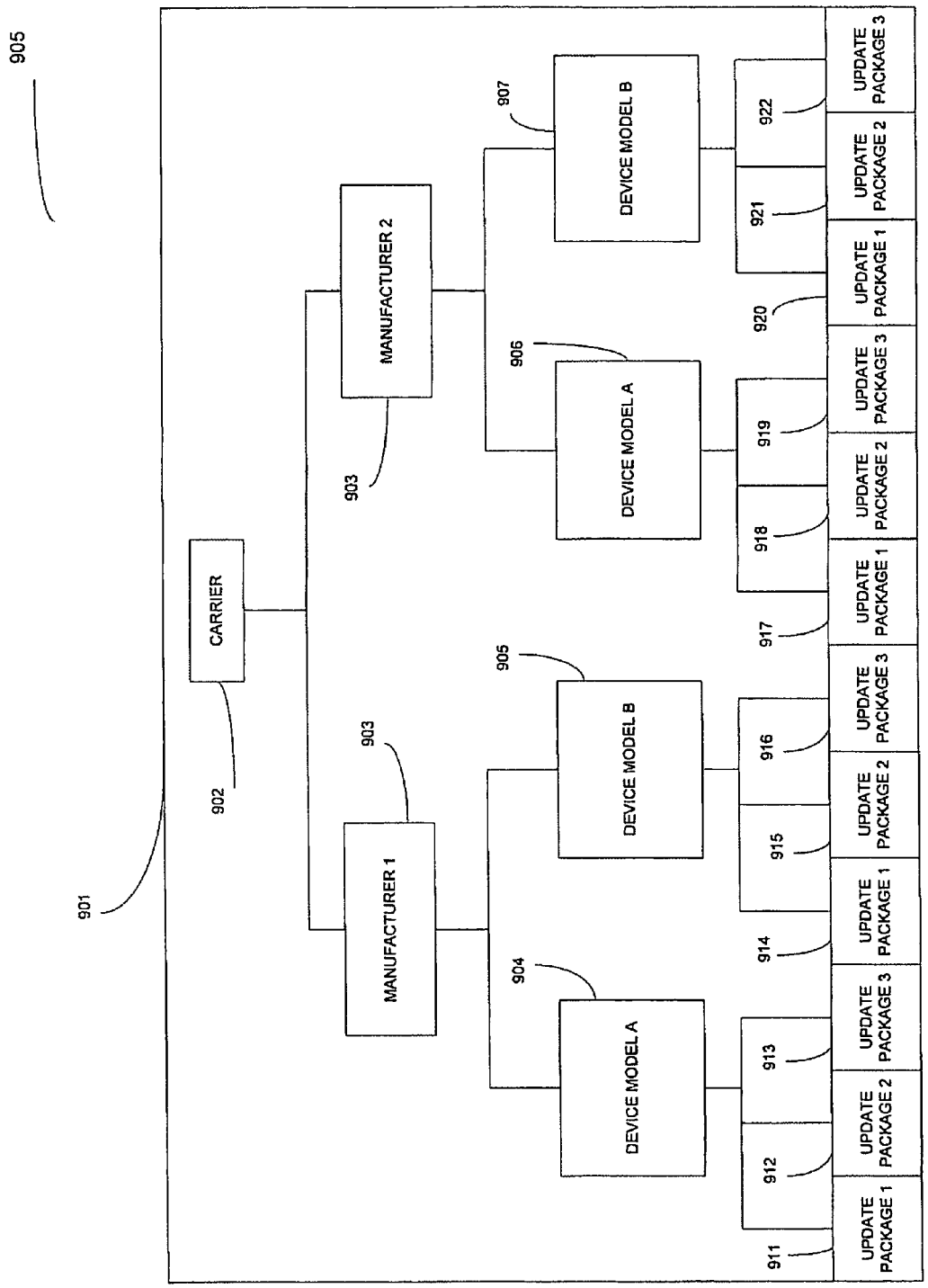
FIG. 9 is a block diagram illustrating an exemplary update package user interface structure in an electronic device network according to an embodiment of the present invention.

FIG. 9 is a block diagram 905 illustrating an exemplary update package user interface structure 901 in an electronic device network according to an embodiment of the present invention. Update packages, such as update packages 911-922, as illustrated in FIG. 9, may be stored in a hierarchical structure based upon an electronic device model and manufacturer update package storing schema. FIG. 9 illustrates one way that the update store may be organized in an embodiment according to the present invention. In FIG. 9, the carrier 902, that is the owner of the carrier electronic device network, may also own the update environment.

In an embodiment according to the present invention, the carrier 902 may comprise the network owner/operator. The carrier 902 may comprise the top rung of the hierarchy in the update package structure, and a plurality of different carriers may be adapted to apply a similar hierarchical update storage structure therein.

Below the carrier 902, a plurality of manufacturers 903 may be organized. In FIG. 9, manufacturer 1 and manufacturer 2 are illustrated, for example. Although only two electronic device manufacturers 903 are shown in FIG. 9, the update package hierarchical structure may comprise a plurality of electronic device manufacturers 903. Below the respective device manufacturers 903, the respective device models 904-907 are illustrated. For example, under manufacturer 1, there are illustrated in FIG. 9, device model A 904 and device model B 905 and under manufacturer 2, there are illustrated, device model A 906 and device model B 907. Again, although only two electronic device models are illustrated for each respective electronic device manufacturer 903 in FIG. 9, the update package hierarchical structure may comprise a plurality of device models for each respective electronic device manufacturer.

Each device model may be associated with a particular collection of update packages. For example, as illustrated in FIG. 9, under model A 904 (manufacturer 1) update packages 1-3 (911-913) are illustrated, under device model B 905 (manufacturer 1) update packages 1-3 (914-916) are illustrated, under model A 906 (manufacturer 2) update packages 1-3 (917-919) are illustrated, and under device model B 907 (manufacturer 2) update packages 1-3 (920-922) are illustrated. Again, although only three update packages for each respective device model are shown in FIG. 9, a plurality of update packages may comprise the update package hierarchical structure.

Figure 10:
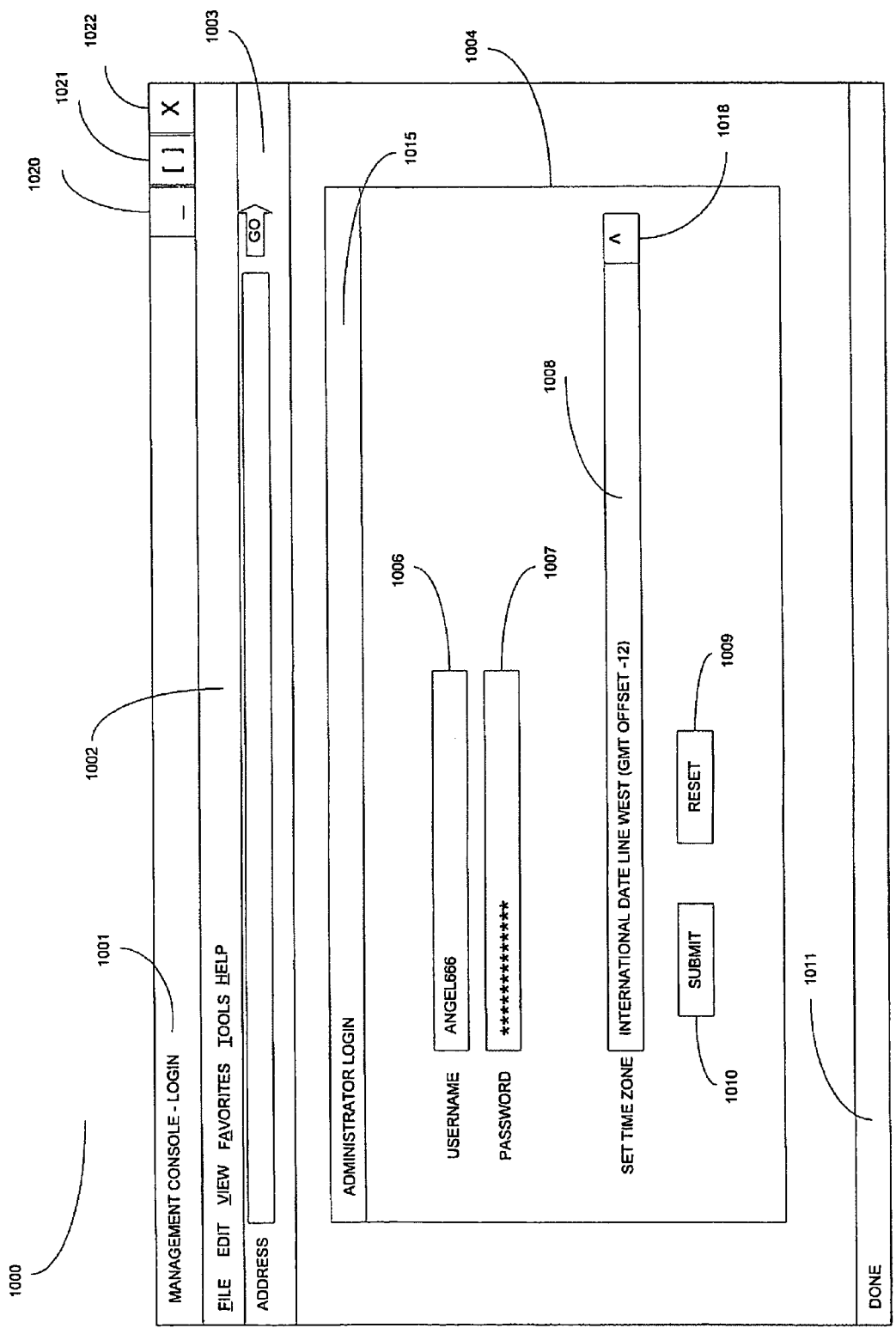
FIG. 10 is a block diagram illustrating an exemplary management console login screen displayable on an electronic device according to an embodiment of the present invention.

FIG. 10 is a block diagram illustrating an exemplary management console login screen 1000 according to an embodiment of the present invention. Authentication to an update store module, such as the one one illustrated in FIG. 1, may be managed through a management console login function. When a user first accesses the management console, or whenever a timeout period has been reached, the user may be directed to the login page 1000 and the login process.

The login screen 1000 may comprise an administrator login window 1004 for administrator login 1015 comprising the following functions: a username or a case sensitive username 1006, a password or a case sensitive password 1007, a set time zone function 1008 and a button adapted to provide a predefined list of selectable supported time zones 1018. The screen may also comprise a submit button 1010 and a reset button 1009. The login screen 1000 may also comprise a title bar 1001, a navigational toolbar 1002, a maximize/minimize button 1020, a full screen/reduced screen button 1021, and an exit program button 1022. The login screen 1000 may also comprise an interne address entry toolbar 1003 and a task progress bar 1011.

Management of username(s) 1006 and password(s) 1007 may be carried out from an Administration/Admin Account screen in the management console. By default, installation of the update store module may create a system administrator initially having username "administrator" and password "administrator" (all typed in small letters). It should be noted that the update store module may be integrated with generic lightweight directory access protocol (LDAP) servers in an embodiment according to the present invention (not shown).

Figure 11:
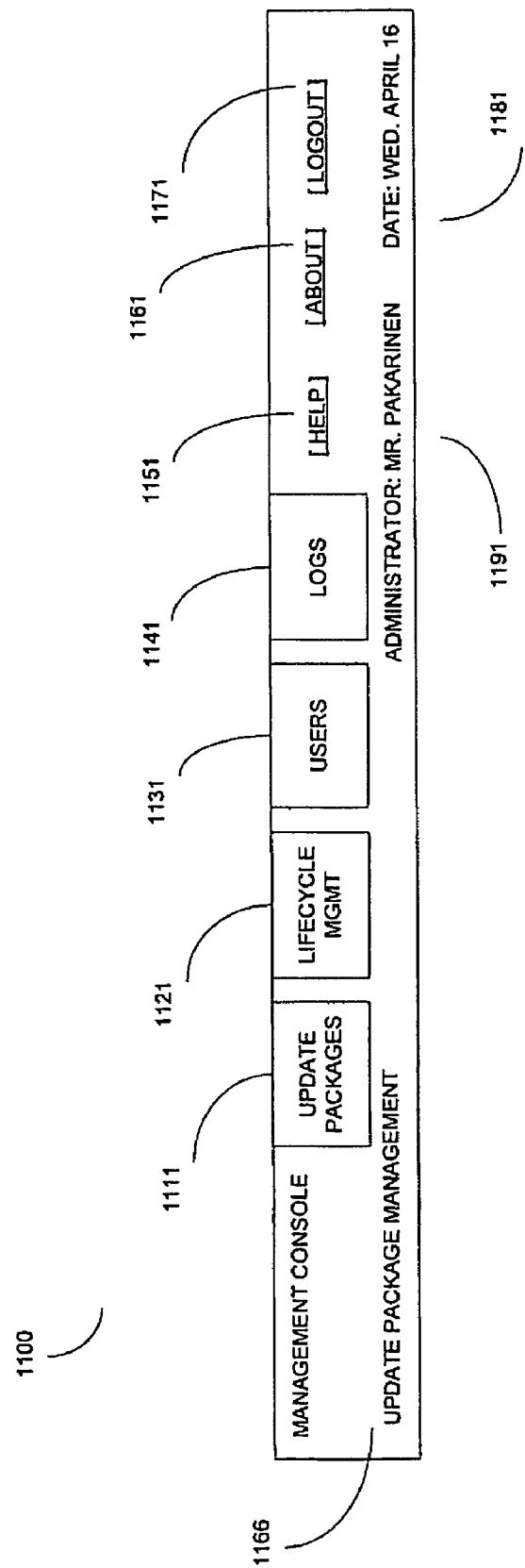
FIG. 11 is a block diagram illustrating an exemplary management console header frame according to an embodiment of the present invention.

FIG. 11 is a block diagram illustrating an exemplary management console header frame 1100 according to an embodiment of the present invention. In FIG. 11, the management console header 1100 is shown in the update package management mode 1166. The management console header 1100 may have a tab-based site structure. The header functions or applications may be divided into the following categories activated by tabs or buttons, for example, an update packages tab 1111 comprising update package management features; a lifecycle management tab 1121 comprising defining rules for lifecycle management; a users tab 1131 comprising user management features including user information, user access rights, and user download group management; and a logs tab 1141 comprising a logging management feature including transaction-logs, audit-logs, and system-logs.

In addition to the above mentioned tabs, the header may also include links for help 1151 to HTML-based help system bundled into the solution, an about link 1161 to an about screen, and a logout link 1171 to log users out.

The default screen for an end-user may be the update package management screen. The current user's name 1191 and the current date/time 1181 may be displayed in the management console header 1100.

Figure 12:
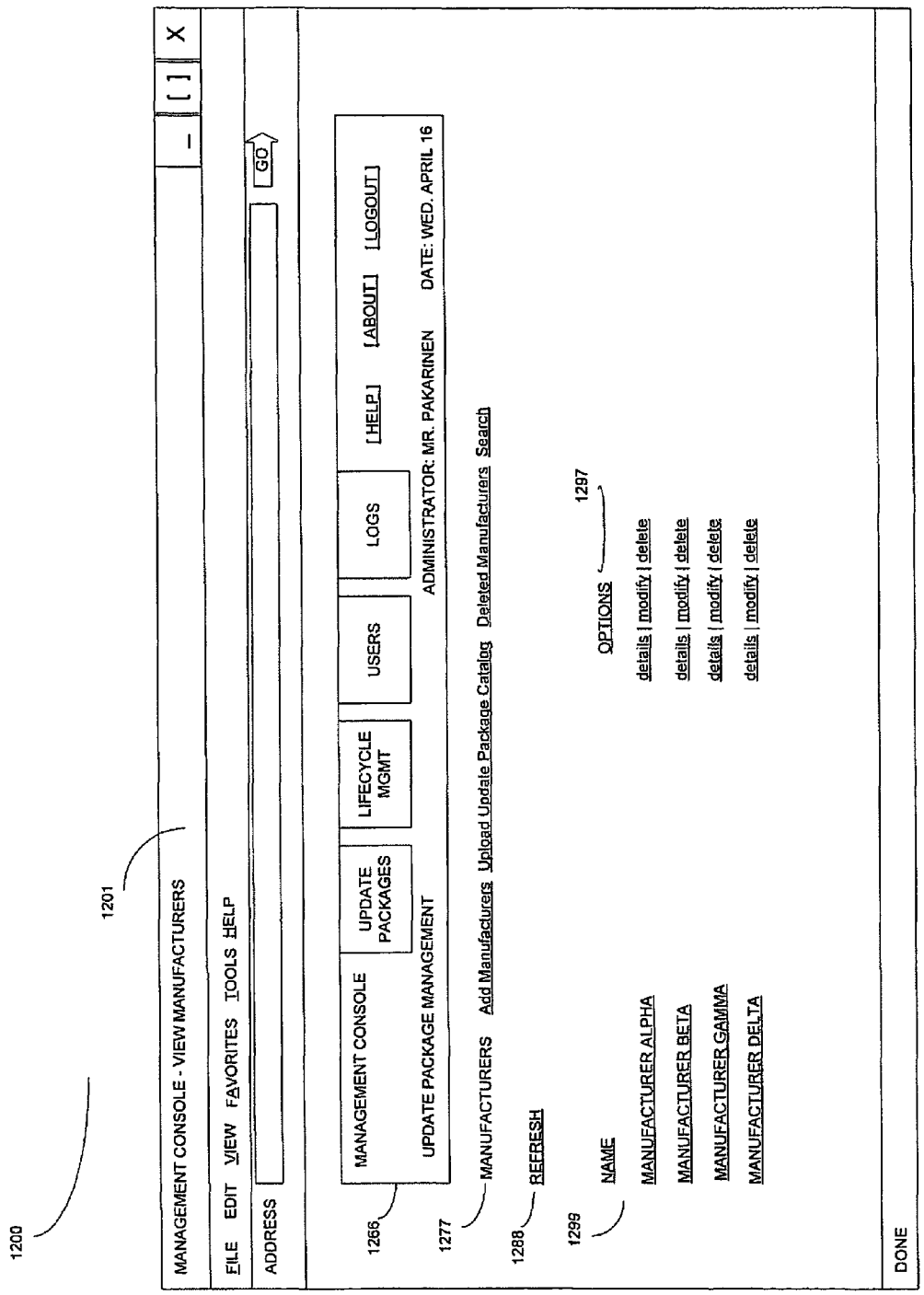
FIG. 12 is a block diagram illustrating an exemplary management console main screen displayable on an electronic device according to an embodiment of the present invention.

FIG. 12 is a block diagram illustrating an exemplary management console view manufacturers screen 1200 according to an embodiment of the present invention. The screen 1200 may comprise a program identification bar 1201 identifying which portion of the program the user is in. The screen 1200 may also comprise a management console header 1266 that may correspond to the management console header illustrated in FIG. 11. In the view manufacturers screen 1200, as illustrated in FIG. 12, a user may be enabled to select from a row of functions 1277 comprising manufacturers, add manufacturers, upload update package catalog, view deleted manufacturers, and search for manufacturers. The user may also select to refresh 1288 the screen 1200 to show new or modified information. The view manufacturers screen may comprise a plurality of manufacturers listed by name 1299. A plurality of options 1297 may be associated with each manufacturer name, such as for example, details, modify, and delete.

Figure 13:
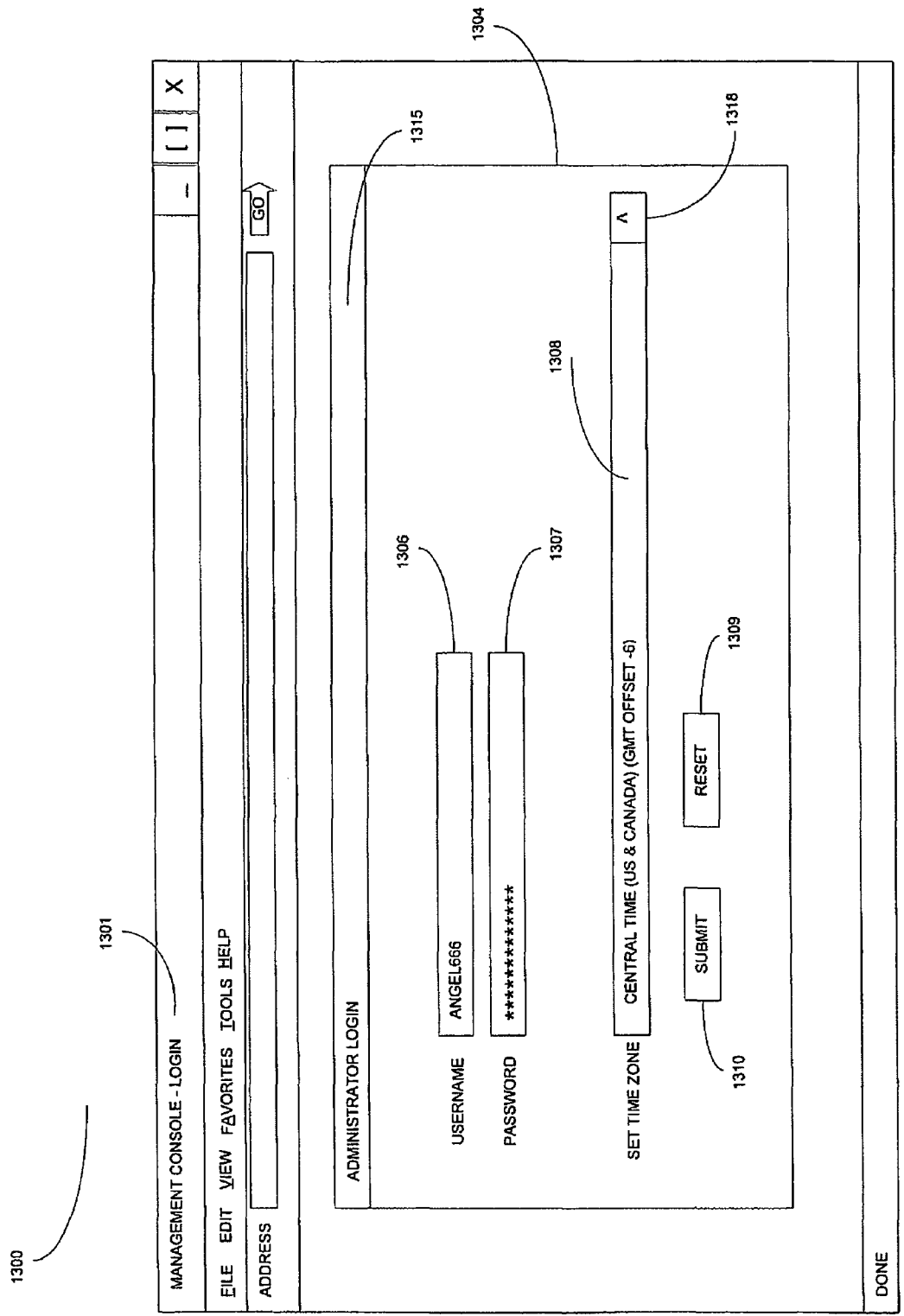
FIG. 13 is a block diagram illustrating time zone selection in an exemplary management console login screen displayable on an electronic device according to an embodiment of the present invention.

FIG. 13 is a block diagram illustrating time zone selection in an exemplary management console login screen 1300 according to an embodiment of the present invention. The screen 1300 may comprise a program identification bar 1301 identifying which portion of the program the user is in. During each login, the user may be prompted to select a time zone in which all times will be displayed in for that particular session. Using web cookies, the system may be adapted to remember the last setting used for a particular browser. The time zones that are selectable may be based on a list supported by the operating system.

The login screen 1300 may comprise an administrator login window 1304 for administrator login 1315 comprising the following functions: a username or a case sensitive username 1306, a password or a case sensitive password 1307, set time zone 1308 and a button adapted to provide a predefined list of selectable supported time zones 1318. The screen may also comprise a submit button 1310 and a reset button 1309.

Time zone support may allow users to see all user interface timestamps in their respective time zone. Date and time data may be stored in the system in the format of universal coordinated time (UTC). An administrator may set the default time zone for the users. Each user may override the default setting and specify a preferred time zone be saved for subsequent system access.

TABLE 1

Supported Time Zones

| Offset to UTC | Time zone |
| --- | --- |
| −12 | International Date Line West |
| −11 | Midway Island, Samoa |
| −10 | Hawaii |
| −9 | Alaska |
| −8 | Pacific Time (US & Canada); Tijuana |
| −7 | Arizona |
| −7 | Chihuahua, La Paz, Mazatlan |
| −7 | Mountain Time (US & Canada) |
| −6 | Central America |
| −6 | Central Time (US & Canada) |
| −6 | Guadalajara, Mexico City, Monterrey |
| −6 | Saskatchewan |
| −5 | Bogota, Lima, Quito |
| −5 | Eastern Time (US & Canada) |
| −5 | Indiana (East) |
| −4 | Atlantic Time (Canada) |
| −4 | Caracas, La Paz |
| −4 | Santiago |
| −3.5 | Newfoundland |
| −3 | Brasilia |
| −3 | Beunos Aires, Georgetown |
| −3 | Greenland |
| −2 | Mid-Atlantic |
| −1 | Azores |
| −1 | Cape Verde Is |
| 0 | Casablanca, Monrovia |
| 0 | Greenwich Mean Time, Dublin, Edinburgh, Lisbon, London |
| 1 | Amsterdam, Berlin, Bern, Rome, Stockholm, Vienna |
| 1 | Belgrade, Bratislava, Budapest, Ljublijana, Prague |
| 1 | Brussels, Copenhagen, Madrid, Paris |
| 1 | West Central Africa |
| 2 | Athens, Istanbul, Minsk |
| 2 | Bucharest |
| 2 | Cairo |
| 2 | Harare, Pretoria |
| 2 | Helsinki, Kyiv, Riga, Sofia, Talinn, Vilnius |
| 2 | Jerusalem |
| 3 | Baghdad |
| 3 | Kuwait, Riyadh |
| 3 | Moscow, St. Petersburg, Volgograd |
| 3 | Nairobi |
| 3 | Tehran |
| 4 | Abu Dhabi,.Muscat |
| 4 | Baku, Tbilisi, Yerevan |
| 4.5 | Kabul |
| 5 | Islamabad, Karachi, Tashkent |
| 5.5 | Chennai, Kolkata, Mumbai, New Delhi |
| 5.75 | Kathmandu |
| 6 | Almaty, Novosibirsk |
| 6 | Astana, Dhaka |
| 6 | Sri Jayawardenepura |
| 6.5 | Rangoon |

TABLE 1-continued

Supported Time Zones

| Offset to UTC | Time zone |
| --- | --- |
| 7 | Bangkok, Hanoi, Jakarta |
| 7 | Krasnoyarsk |
| 8 | Beijing, Chongqing, Hong Kong, Urumqi |
| 8 | Irkutsk, Ulaan Bataar |
| 8 | Kuala Lumpur, Singapore |
| 8 | Perth |
| 8 | Taipei |
| 9 | Osaka, Sapporo, Tokyo |
| 9 | Seoul |
| 9 | Yakutsk |
| 9.5 | Adelaide |
| 9.5 | Darwin |
| 10 | Brisbane |
| 10 | Canberra, Melbourne, Sydney |
| 10 | Guam, Port Moresby |
| 10 | Hobart |
| 10 | Vladivostok |
| 11 | Magadan, Solomon Is., New Caledonia |
| 12 | Auckland, Wellington |
| 12 | Fiji, Kamchatka, Marshall Is. |
| 13 | Nuku'alofa |

Table 1 illustrates an exemplary listing of supported time zones usable in an update store module according to an embodiment of the present invention.

The lifecycle management module may comprise features for lifecycle management of the update packages. The features may include the manufacturer, client management, as well as update package state flow and update package management.

Figure 14:
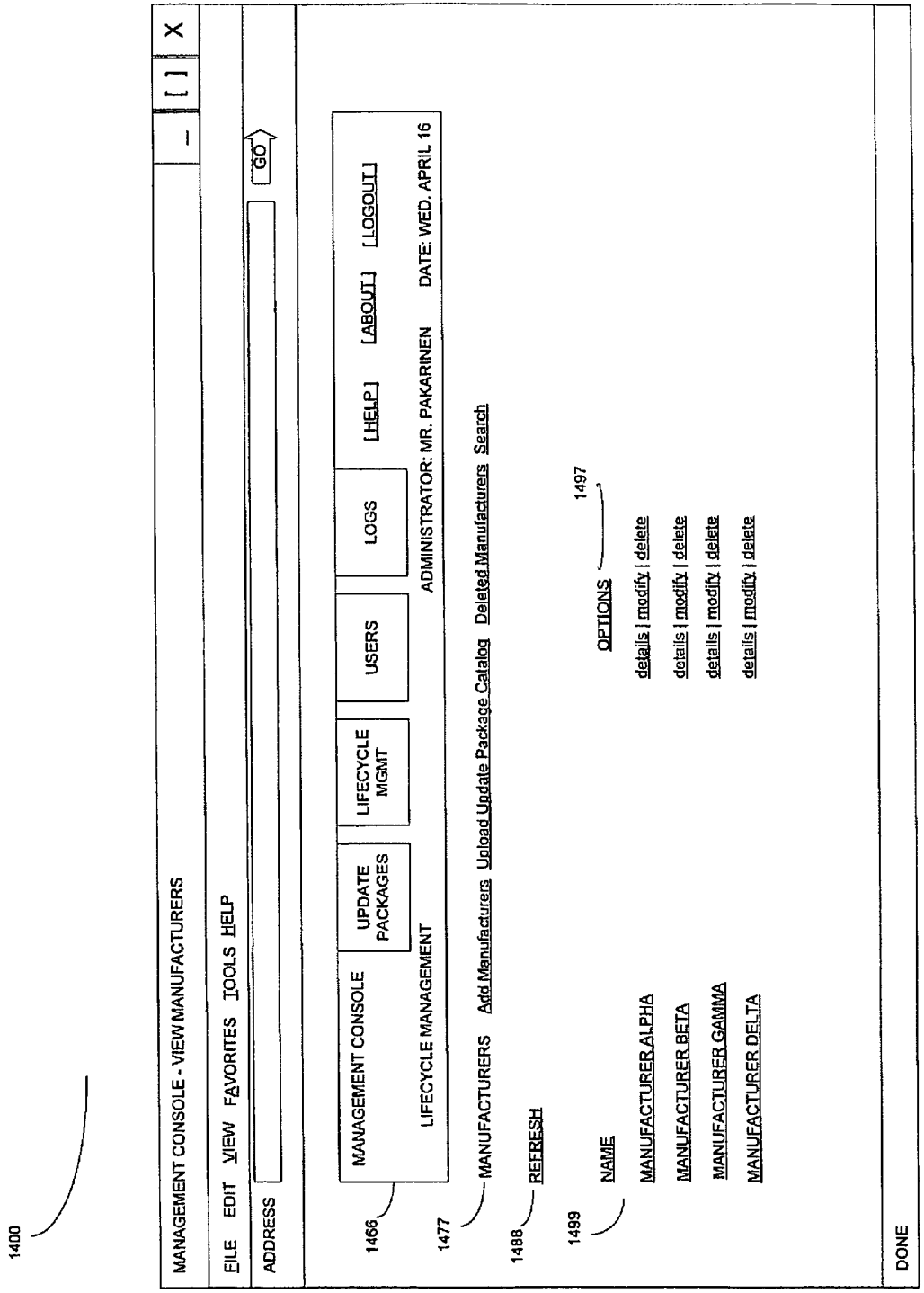
FIG. 14 is a block diagram illustrating an exemplary manufacturer management screen displayable on an electronic device according to an embodiment of the present invention.

FIG. 14 is a block diagram illustrating an exemplary view manufacturers management screen 1400 and management console header 1466 having the lifecycle management tab selected in accordance with an embodiment of the invention. The user may be able to add a new electronic device manufacturer to the update store module if permitted by a defined user's role, for example, an administrative role.

The electronic device system may prompt the end-user for a unique name of the manufacturer, when a new manufacturer is being added, determine whether manufacturer information regarding the named manufacturer has already been entered or created, and determine whether to create a new manufacturer folder, if no previously created matching folder is located.

In FIG. 14, the management console view manufacturers screen 1400 may comprise management console header 1466. In the view manufacturers screen 1400, as illustrated in FIG. 14, the user may select from a row of functions 1477 comprising manufacturers, add manufacturers, upload update package catalog, view deleted manufacturers, and search for manufacturers.

The end-user may also select to refresh 1488 the screen 1400 to show new or modified information. The view manufacturers screen 1400 may also comprise a plurality of manufacturers listed by name 1499, such as for example, manufacturer alpha, manufacturer beta, manufacturer gamma, and manufacturer delta. Although only four exemplary manufacturers are illustrated in FIG. 14, numerous additional manufacturers may also be listed and manipulated.

A plurality of options 1497 may also be associated with each manufacturer name, such as for example, details, modify, and delete. Although only the exemplary options details, modify, and delete are illustrated in FIG. 14, numerous additional options may be listed and manipulated.

Figure 15:
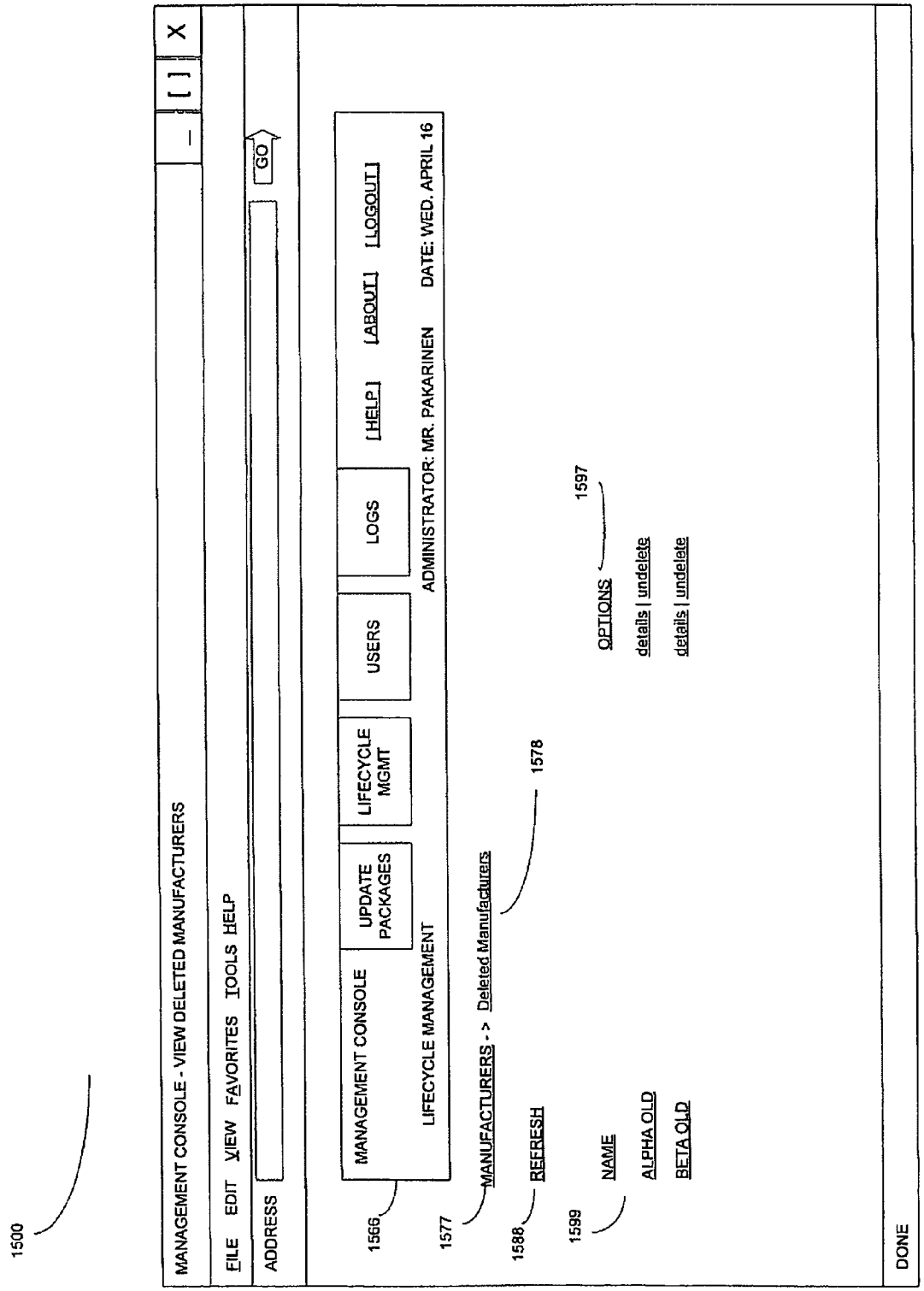
FIG. 15 is a block diagram illustrating an exemplary view deleted manufacturer screen displayable on an electronic device according to an embodiment of the present invention.

FIG. 15 is a block diagram illustrating an exemplary view deleted manufacturers screen 1500 and management console header 1566 according to an embodiment of the present invention. Deletion of an electronic device manufacturer folder may be permitted when the folder contains no associated client electronic devices. No client devices may be displayed when the electronic device network technology advances beyond the electronic device technology for a particular electronic device manufacturer, or when no continued license agreements exist between the electronic device network and the electronic device manufacturer. The actual manufacturer record/folder represented by 1599 may or may not be removed from the database. Prior to the release of new electronic devices, unnecessary folders may be marked as obsolete or deleted and may not be visible to non-administrative end-users.

In an embodiment according to the present invention, a screen may be displayed showing deleted manufacturers 1578, wherein an end-user may be permitted to undelete an electronic device manufacturer, if applicable. Once undeleted, the electronic device manufacturer folder may show up in the view manufacturers screen 1500, i.e., the screen showing all active manufacturers. End-users endowed with appropriate (for example, read/write) privileges may also be able to add new client electronic devices to the electronic device manufacturer folder.

While engaging the view deleted manufacturers screen 1500, the end-user may be provided selections such as manufacturer 1577, and deleted manufacturers 1578. The end-user may also be able to refresh 1588 the screen when an entry has been changed, added or deleted. The screen 1500 may comprise a list of names of deleted manufacturers 1599, such as for example, alpha old and beta old, as illustrated in FIG. 15. Associated with each of the deleted manufacturers, an end-user may be provided with options 1507, such as for example, details and undelete.

Figure 16:
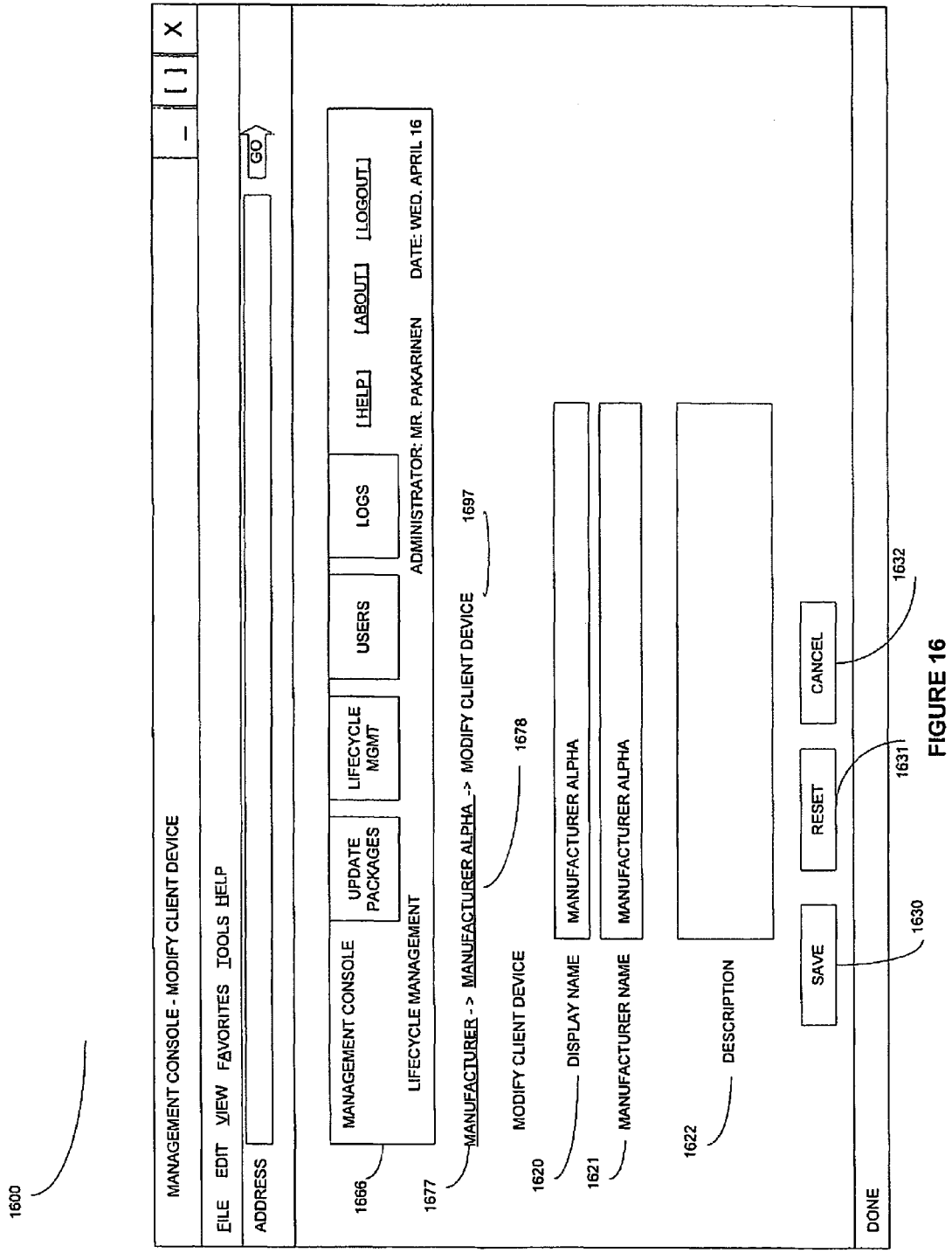
FIG. 16 is a block diagram illustrating an exemplary modify manufacturer client device data screen displayable on an electronic device according to an embodiment of the present invention.

FIG. 16 is a block diagram illustrating an exemplary modify client device screen 1600 and a management console header 1666 having the lifecycle management tab selected, according to an embodiment of the present invention. The end-user may be enabled to select from the following screen options: manufacturer 1677, manufacturer alpha 1678, for example, and modify client device 1697. The end-user may be able to modify the manufacturer name 1621, display name 1620, and manufacturer description 1622. By default, the display name 1621 may correspond to the manufacturer name 1620, as illustrated in FIG. 16. An end-user may be able to change the display name 1620 to another name, if desired. Update package selection criteria may be based upon an original manufacturer name 1621, therefore, in some instances, a request for an update package must correspond accordingly. The modify client screen 1600 may also be provided with buttons, such as for example, save 1630, reset 1631, and cancel 1632.

Figure 17:
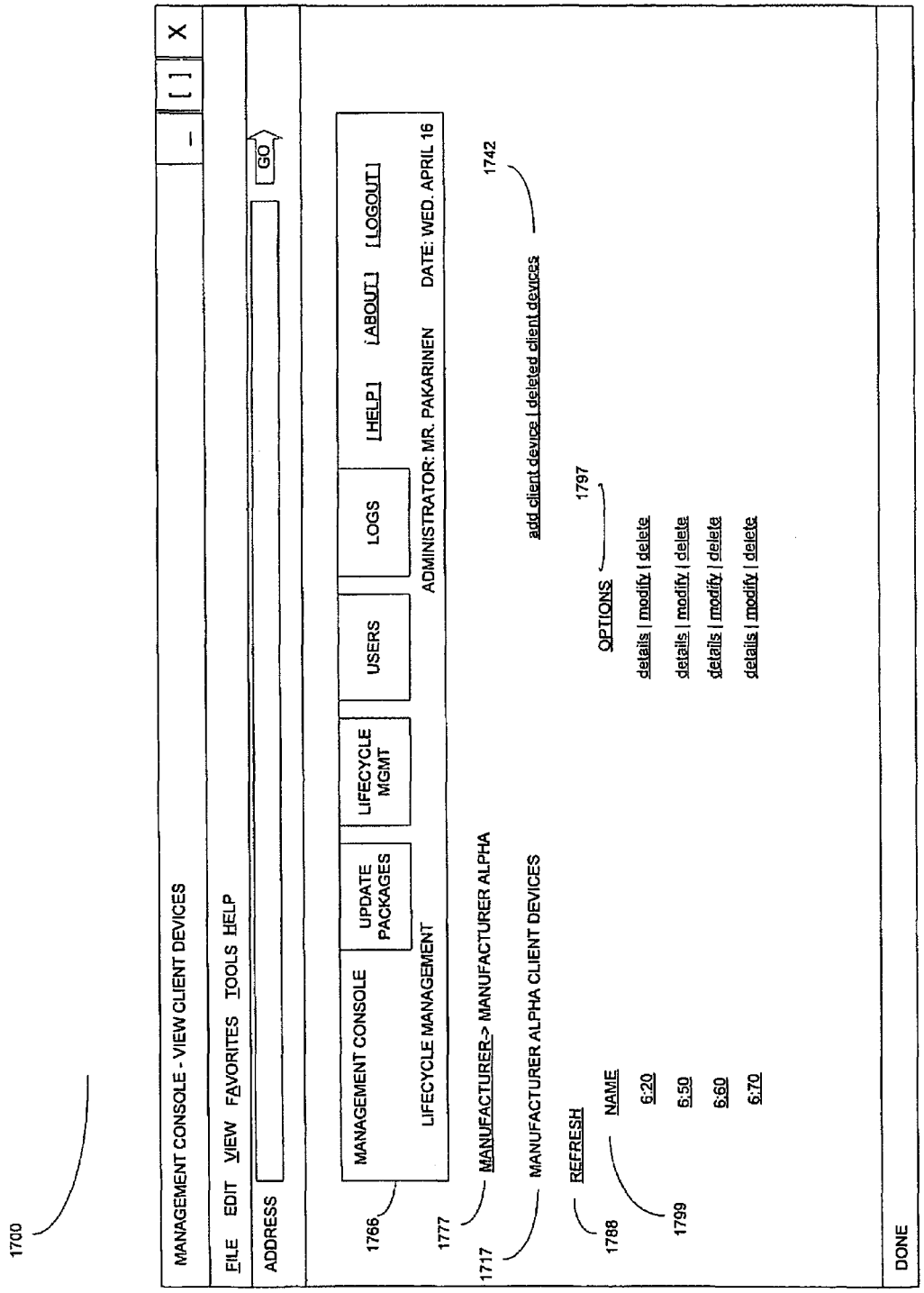
FIG. 17 is a block diagram illustrating an exemplary view client electronic device screen displayable on an electronic device according to an embodiment of the present invention.

FIG. 17 is a block diagram illustrating an exemplary view client devices screen 1700 and management console header 1766 having the lifecycle management tab selected, according to an embodiment of the present invention. The end-user may be able to add a new client electronic device or view deleted client devices 1742 listed under a particular manufacturer name 1717 selected from a manufacturer selection 1777. The electronic device system may prompt the end-user for a name 1799 of the client electronic device, as illustrated in FIG. 17, check whether a folder for that particular model has already been created, and create a new folder if no corresponding folder is located. The end-user may also be provided with a plurality of options 1797, such as for example, details, modify, and delete.

Figure 18:
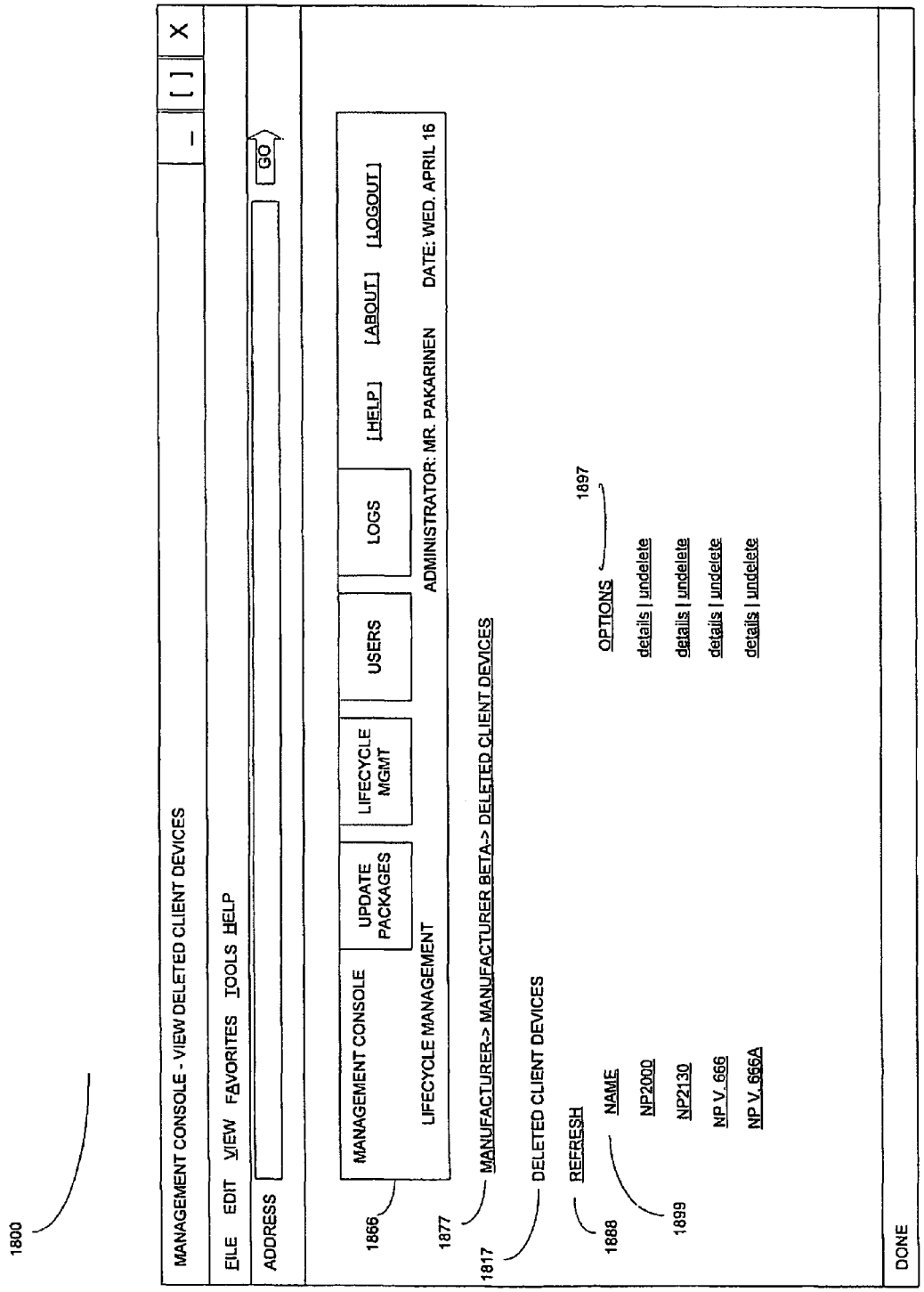
FIG. 18 is a block diagram illustrating an exemplary view deleted client devices screen displayable on an electronic device according to an embodiment of the present invention.

FIG. 18 is a block diagram illustrating an exemplary view deleted client devices screen 1800 and management console header 1866, according to an embodiment of the present invention. The view deleted client devices screen 1800 may provide an end-user options such as refresh 1888 and manufacturer selection 1877. An end-user endowed with appropriate (for example, read/write) privileges may be able to delete an existing client electronic device for which no corresponding update packages are being stored, exist, or are authorized. The system may be adapted to confirm the deletion via a super-administrator function, for example. The actual folder/record corresponding to a deleted electronic/client device may not actually be removed from the database. Rather, the folder/record corresponding to a deleted electronic/client device may be marked as deleted and may not be visible to any end-user other than an administrator of super-administrator, for example. The view deleted client device screen 1800 may show all of the deleted client electronic devices by name 1899, thus permitting an end-user to undelete the device information and see details corresponding to a deleted client electronic device 1897. Once undeleted, the client electronic device may again show up in a client device screen showing all active client electronic devices. End-users endowed with appropriate (for example, read/write) privileges may also be able to add update packages to the electronic device folder.

Figure 19:
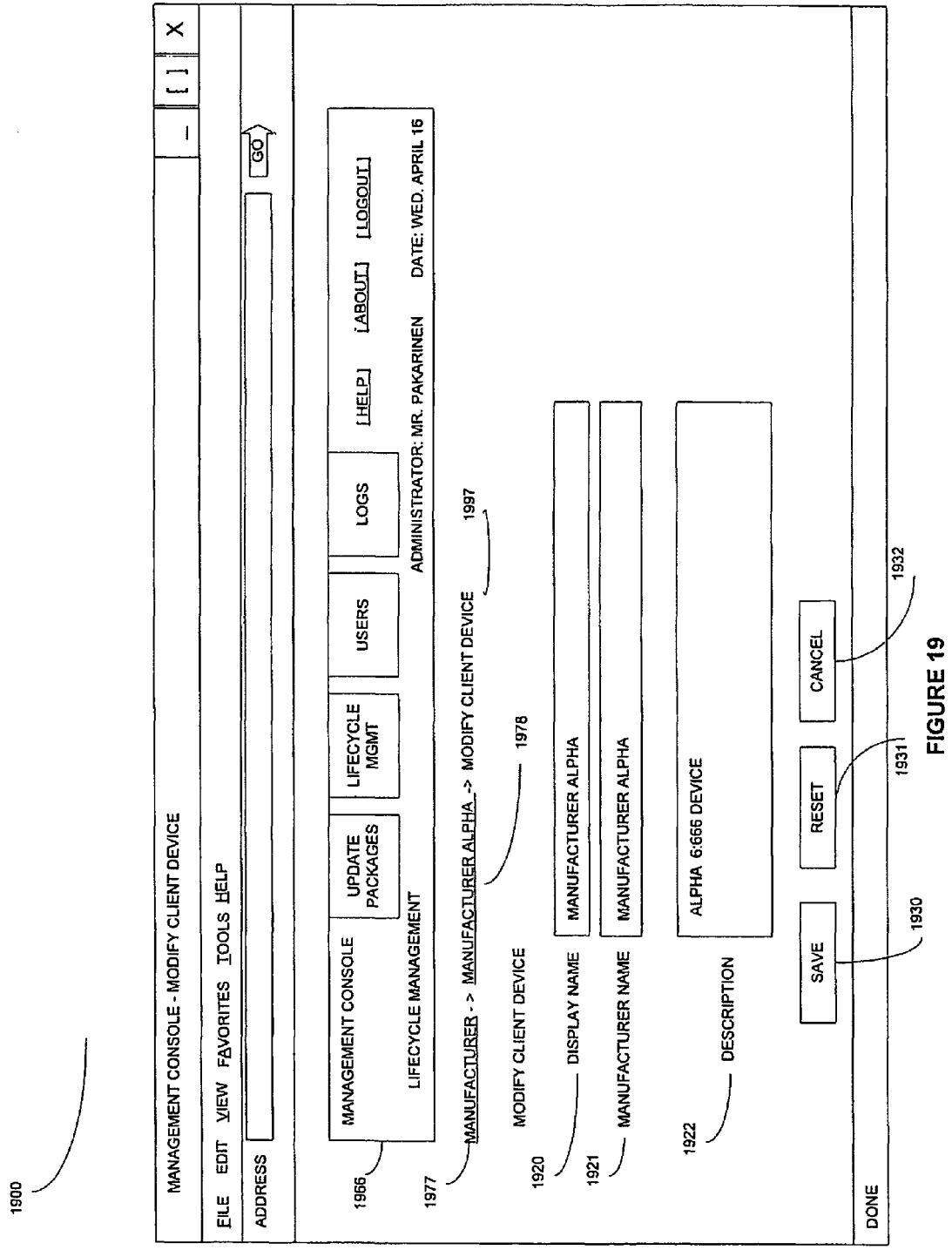
FIG. 19 is a block diagram illustrating an exemplary modify client device screen displayable on an electronic device according to an embodiment of the present invention.

FIG. 19 is a block diagram illustrating an exemplary modify client device screen 1900 and management console header 1966 having the lifecycle management tab selected according to an embodiment of the present invention. The modify client device screen 1900 may provide an end-user option such as manufacturer selection 1977. The end-user may be able to modify the client electronic device manufacturer name 1921, display name 1920, and client electronic device description 1922. By default, the display name 1920 may correspond to the client device name. The end-user may be able to change the display name 1920 to another name, if desired. Update package selection criteria may be based upon an original client device name, and not the display name 1920. All requests for the update packages associated therewith may be required to use a corresponding client device name. The end user may be enabled to select from the following screen options: manufacturer 1977, manufacturer alpha 1978, for example, and modify client device 1997. The modify client screen 1900 may also be provided with buttons such as for example, save 1930, reset 1931, and cancel 1932.

Figure 20:
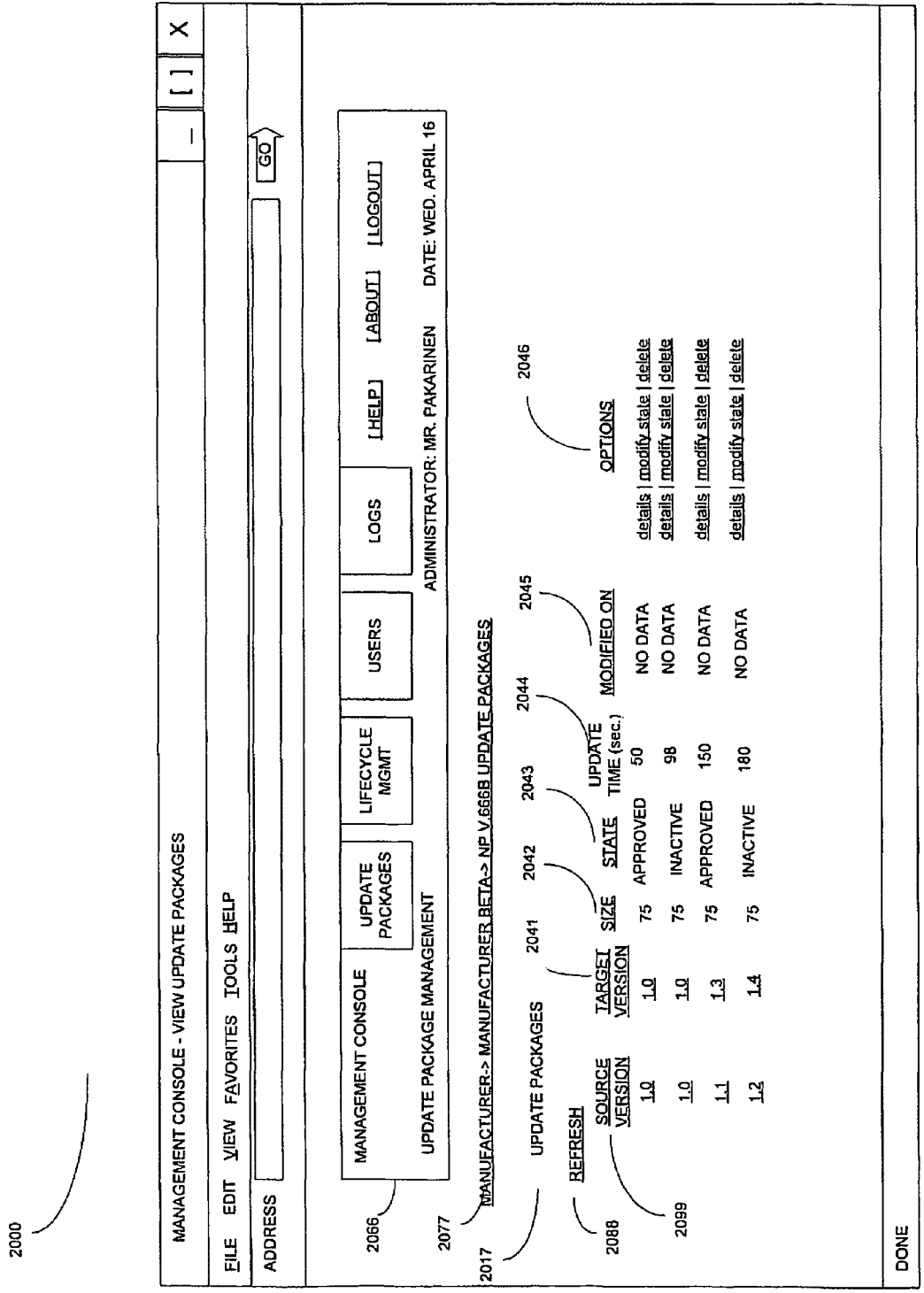
FIG. 20 is a block diagram illustrating an exemplary view update packages screen displayable on an electronic device according to an embodiment of the present invention.

FIG. 20 is a block diagram illustrating an exemplary update package management screen 2000 and management console header 2066 having the update packages management tab selected, according to an embodiment of the present invention. The end user may be enabled to select from the following screen options: manufacturer 2077, manufacturer beta, for example, and update package NP V.666B. The end-user may be able to add a update packages under a particular client electronic device name, for example, manufacturer beta. The data format of the upload instructions may comprise an update package catalog from an update generator. The electronic device system displayed in the screen 2000 may be adapted to verify whether the update package being added already exists in the system.

Using the update package management screen, an end-user may access at least the following functions: upload an update package catalog, the catalog comprising a list of update packages 2017 capable of and ready to be uploaded to an associated update store module; delete update packages from the catalog, the catalog comprising a list of the deleted update packages that may be undeleted; and a search for update packages.

An update package management screen 2000 according to an embodiment of the present invention may, for example, comprise the following columns:

a source version column 2099 parsed from the update package catalog;

a target version column 2041 parsed from the update package catalog;

a size of update package column 2042 comprising the actual size of the update package, including update package metadata and security headers;

a state of the update package column 2043 comprising the current state of the update package;

a time that updating to memory takes column 2044 for each particular update package and an estimated time for firmware update processing on a mobile device using a particular update package;

a modified-on date column 2045 comprising the date of the last change to the update package and/or corresponding update package information; and an options column 2046 comprising details, modified state, and delete actions for each update package.

Figure 21:
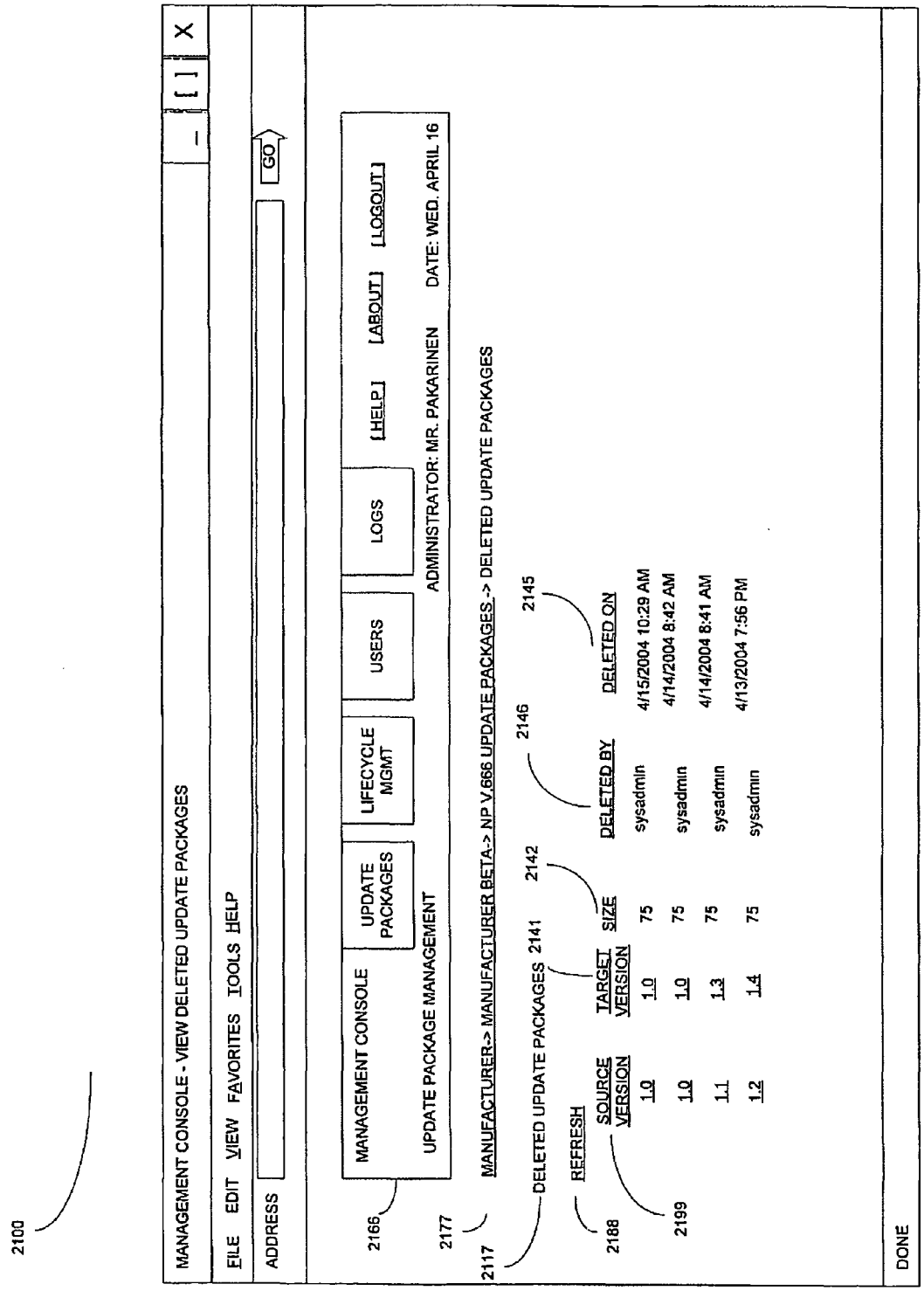
FIG. 21 is a block diagram illustrating an exemplary view deleted update packages screen displayable on an electronic device according to an embodiment of the present invention.

FIG. 21 is a block diagram illustrating an exemplary deleted update packages screen 2100 and a management console header 2166 having the update package management tab selected, according to an embodiment of the present invention. An end-user having appropriate (for example, read/write) privileges may be able to delete an existing update package for a variety of reasons. An electronic device system in accordance with the present invention may confirm the deletion via a super administrator function. The end-user may be enabled to select from the following screen options: manufacturer 2177, manufacturer beta, for example, and update packages NP V.666B, and deleted update packages. The actual deleted record/folder may not be removed from the database. Rather, the deleted record/folder may be marked as deleted and may not be visible to an unauthorized end-user. The screen 2100 may show all deleted update packages 2117 permitting an authorized end-user to undelete a particular update package. Once undeleted, the update package may show up in the screen that shows all active update packages, such as screen 2000 as illustrated in FIG. 20, and end-users endowed with appropriate (for example, read/write) privileges may be able to add update packages to the folder.

The update package management screen 2100 according to an embodiment of the present invention may comprise the following columns: a source version column 2199 parsed from the update package catalog; a target version column 2141 parsed from the update package catalog; a size column of update package column 2142 comprising the actual size of the update package, including update package metadata and security headers; a deleted-by column 2046 comprising the name of the end-user who deleted the update package; and a deleted-on date column 2145 comprising the date of deletion of the update package and/or corresponding update package information.

Figure 22:
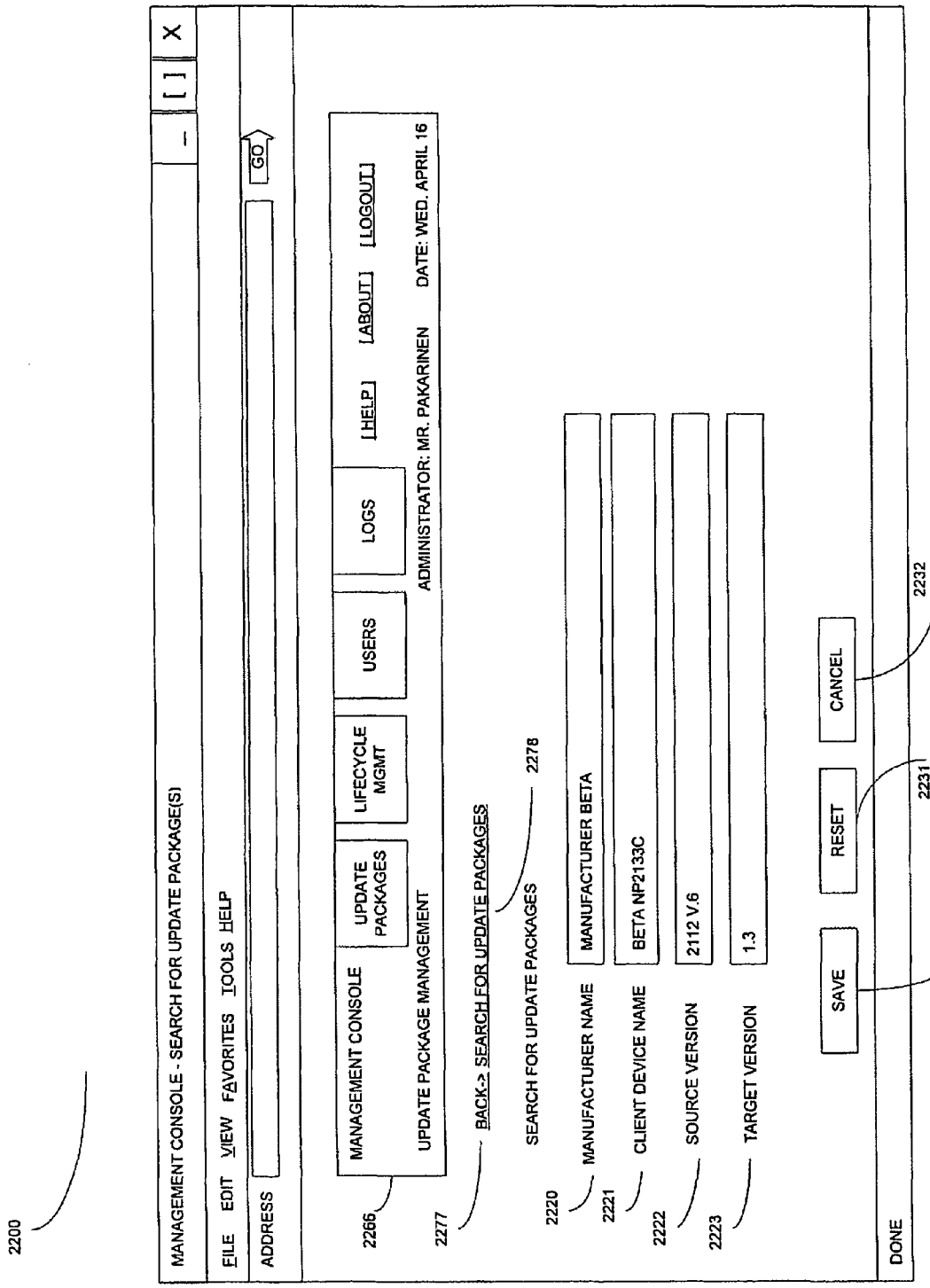
FIG. 22 is a block diagram illustrating an exemplary update package searching screen displayable on an electronic device according to an embodiment of the present invention.

FIG. 22 is a block diagram illustrating an exemplary update package search screen 2200 and a management console header 2266, according to an embodiment of the present invention. The search criteria may comprise, for example, a manufacturer name 2220, a client electronic device name 2221, a source version 2222, and a target version 2223 of the update package being searched for. Entering the above-named values into a plurality of search criteria prompt boxes may produce a list of update packages satisfying the entered criteria. The search page 2200 may also be available from the first page of the update package management set of screens, such as for example, FIG. 12. The end-user may be enabled to go back 2277 or to search further 2278 for additional update packages. The search screen 2200 may also comprise a plurality of buttons, such as for example, save 2230, reset 2231, and cancel 2232.

Figure 23:
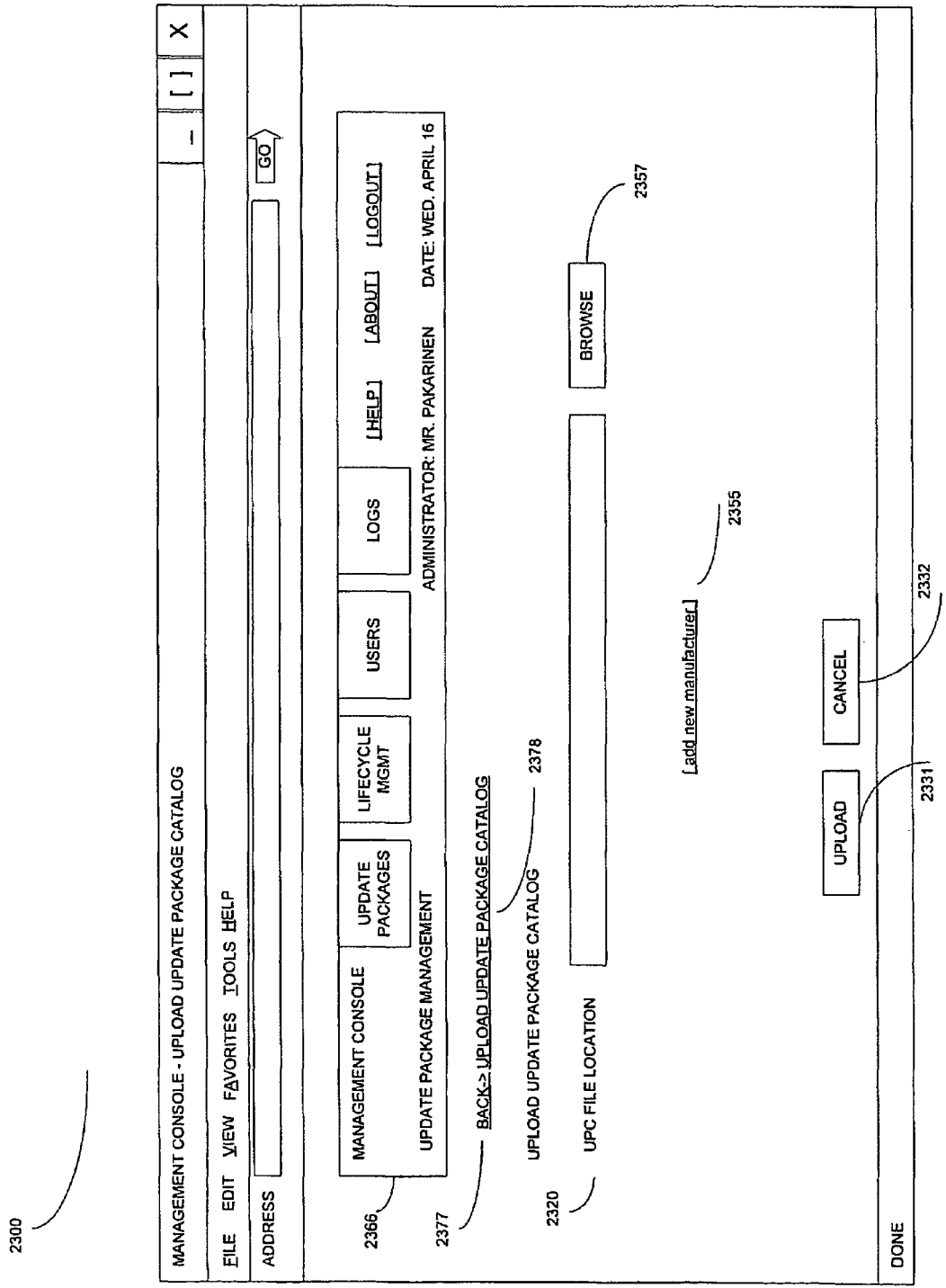
FIG. 23 is a block diagram illustrating an exemplary update package catalog uploading screen displayable on an electronic device according to an embodiment of the present invention.

FIG. 23 is a block diagram illustrating an exemplary update package catalog upload screen 2300 and a management console header 2366, according to an embodiment of the present invention. An update package catalog (UPC) may be used to upload a set of update packages. The UPC may be an extensible markup language (XML) file containing binary update package images along with corresponding meta-data information, eliminating the need to specify meta-data manually. A single UPC file may contain multiple update package binary images for a particular manufacturer and corresponding client electronic devices.

A UPC file may be uploaded if the corresponding manufacturer and client electronic device folders are present and exist on the receiving system at the time of upload. If the folders are not present, then the end-user may enter (add new manufacturer 2355) the manufacturer name and/or client electronic device name and information before the upload commences. The upload screen 2300 may have links for conveniently entering manufacturer information, etc., and may provide with a file location entry box 2320. Files may also be located via a browse function button 2357 and associated lookup screen.

Update package upload from the update generator may be implemented by opening an HTML-based upload screen directly from the update generator application, for example. From the upload screen 2300, the end user may be enabled to select the update package catalog to be uploaded 2378, or go back 2377, manage an update package parsing screen 2400, upload 2331 the particular update packages to the update store module, and/or cancel the upload process 2332.

Figure 24:
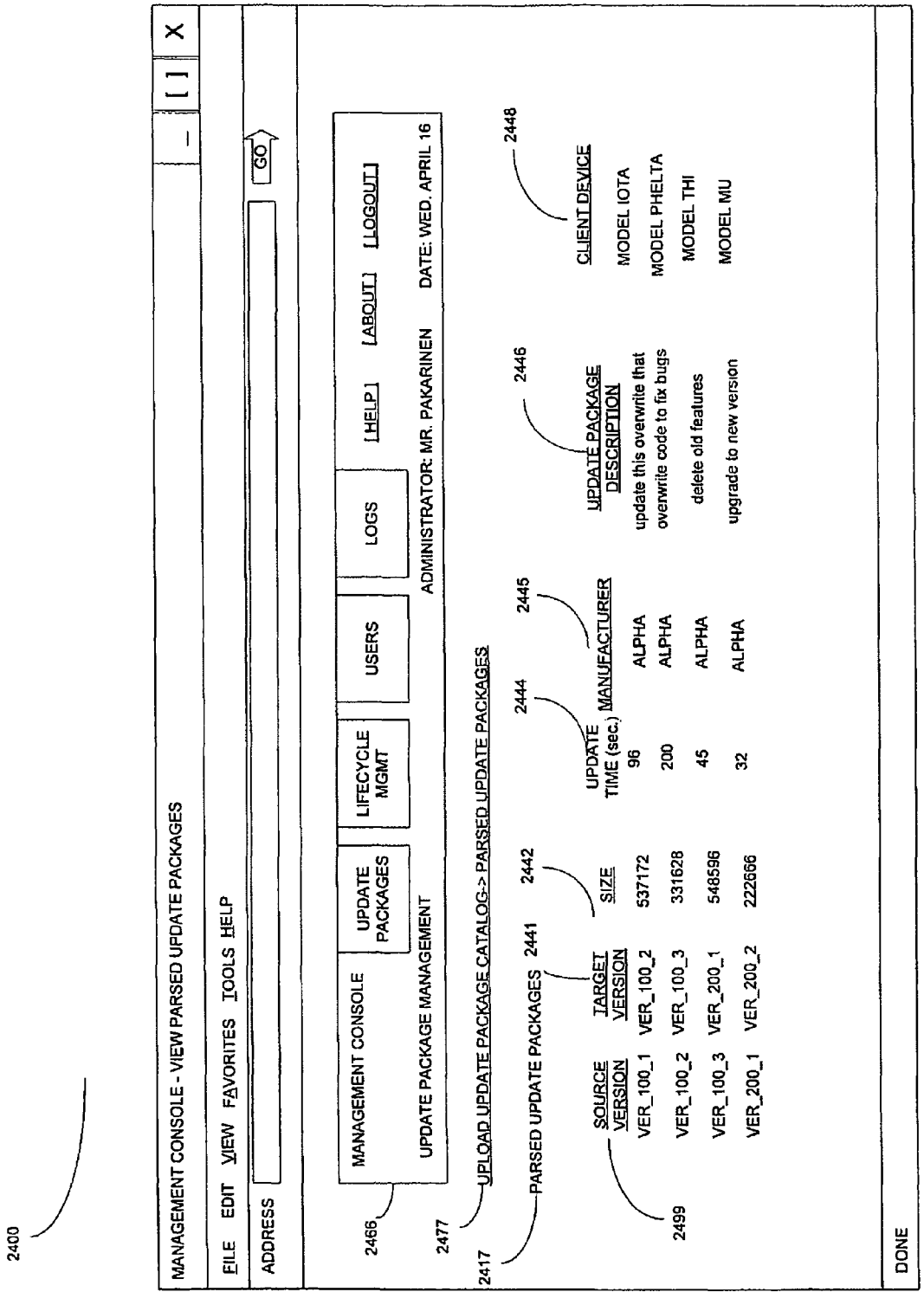
FIG. 24 is a block diagram illustrating an exemplary parsed update packages viewing screen displayable on an electronic device according to an embodiment of the present invention.

FIG. 24 is a block diagram illustrating an exemplary update package parsing screen 2400 and a management console header 2466, according to an embodiment of the present invention. When a new update package is uploaded, the system may verify and validate the update package to ensure the integrity and validity of the update package before the update package is accepted by update store module such as, for example as illustrated in FIG. 1.

By managing roles, a system administrator may be able to define a role for uploading only, e.g., if the end-user has the uploading role, the end-user may not access any other screens except the upload screen and the update package parsing screen, for example.

The update package catalog from the management console application may be implemented as described above and the end-user may also be enabled to view parsed update packages 2477. Depending upon the end-user's access rights, one end-user may see a completely different screen and program functionality from the management console that another end-user having different access rights may see. After a physical file (update package, for example) is uploaded to the update store module, the update store module may be adapted to parse the content and show the results to the end-user.

From the upload screen 2400, the end-user may be able to select update packages to be uploaded to the electronic device system, including any additional information such as, for example, update time 2444 and update package description 2446 for each update package to be uploaded.

The view parsed update packages screen 2400 may show all parsed update packages 2417 permitting an end-user to select a particular update package. Once selected, the update package may show up in the screen that shows all active update packages, and end-users endowed with appropriate (for example, read/write) privileges may be able to add update packages to the folder.

The view parsed update package screen 2400, according to an embodiment of the present invention, may comprise the following columns: a source version column 2499 parsed from the update package catalog; a target version column 2441 parsed from the update package catalog; a size of update package column 2442 comprising the actual size of the update package, including update package metadata and security headers; an update time column 2444, a manufacturer name column 2445, an update package description column 2446, and a corresponding client electronic device column 2448.

Figure 25:
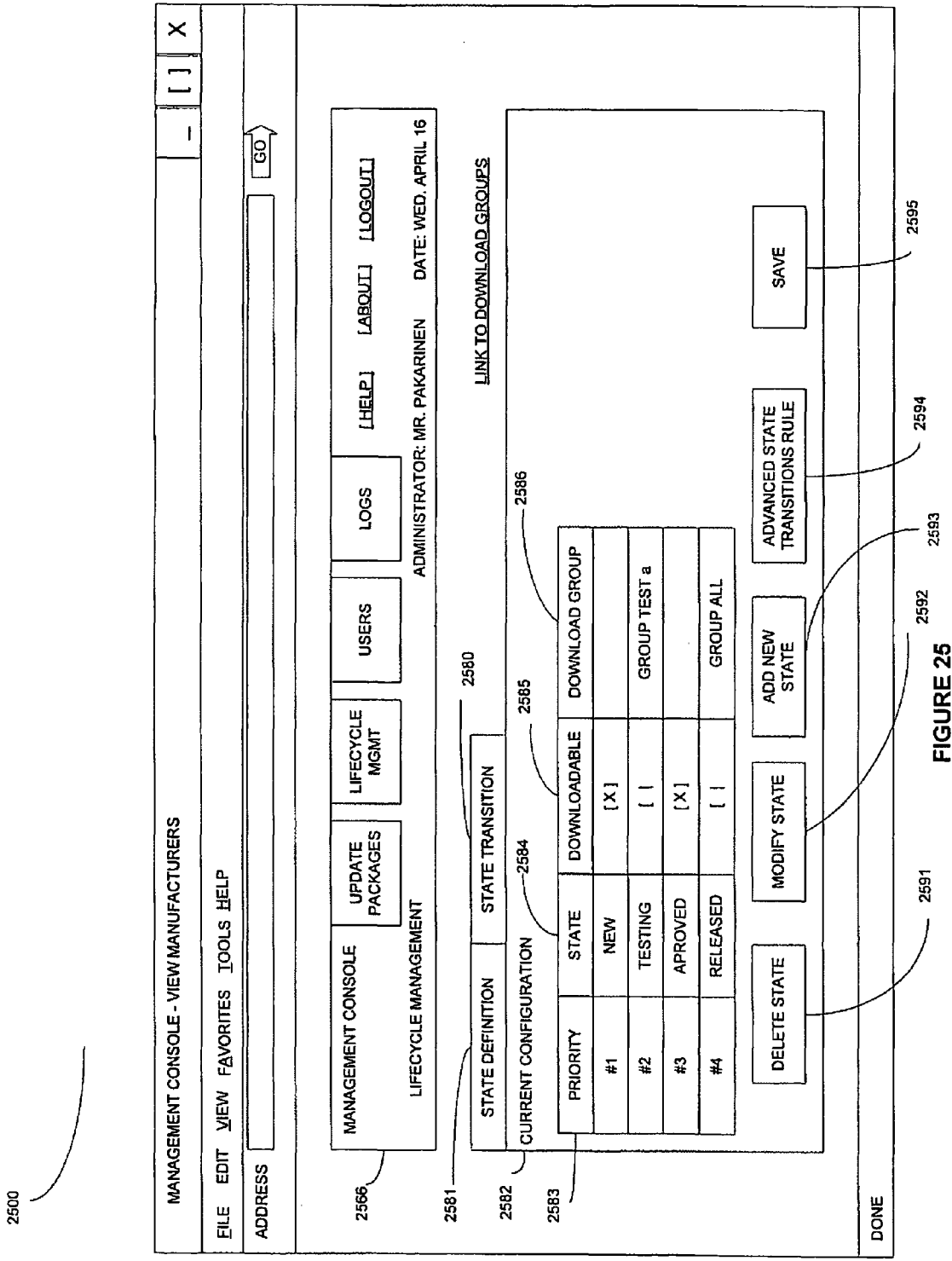
FIG. 25 is a block diagram illustrating an exemplary view manufacturers and update manufacturer device state definition screen displayable on an electronic device according to an embodiment of the present invention.

FIG. 25 is a block diagram illustrating an exemplary update state definition screen 2500 and a management console header 2566 having the lifecycle management tab selected, according to an embodiment of the present invention. From the update state definition screen 2500, an end-user may be able to modify the update package states. By managing update package states, an end-user may define the lifecycle workflow for update packages in the electronic device update system. Rule-based workflow coordinates and enforces which update package may be selected, who may be permitted to download the update package, and the next state of transition for each update package.

From the state definition screen 2500, (i.e., having the state definition tab selected), an end-user may be able to modify the update package states. From the lifecycle configuration sub-screen 2582, an end-user may be enabled to create and manage update package states for lifecycle current configuration (s) for the update store modules. From the lifecycle current configuration sub-screen 2582, an end-user may also set the following items. The end-user may be enabled to set the priority of the state 2584. Given the current lifecycle configuration, for any update package request resolved to more than one downloadable update package, the high priority (#1 being the highest) state may be selected as the update package for download. The end-user may also set the state. The state may comprise the name of the state and the state name may be unique 2584.

The end-user may also set a downloadable parameter 2585. When the update package has the downloadable column 2585 selected, the end-user may specify a download group for the particular entry 2686. The downloadable parameter may also be used for the lifecycle management of update packages. The downloadable rule may be built upon the following restrictions. There may be only one source version per downloadable state. There may be multiple downloadable states for a same source version, as long as the states are different from each other. If the update selection criteria retrieves more than one update package, the priority of the state may be used to identify the unique update package to retrieve.

The end-user may also set the download group 2586. If the downloadable parameter checkbox column 2585 is not selected, the download group list box may be grayed out and not selectable. There may be only one state having the "group all" download group selected.

The end-user may also be able to delete a state 2591, modify a state 2592, add a new state 2593, apply an advanced state transitions rule 2594, and save update package information 2595, for example, via a plurality of buttons on the current screen 2500. The end-user may also be enabled to select a state definition sub-screen 2581 and a state transition sub-screen 2580 by selecting the appropriate tabs.

Figure 26:
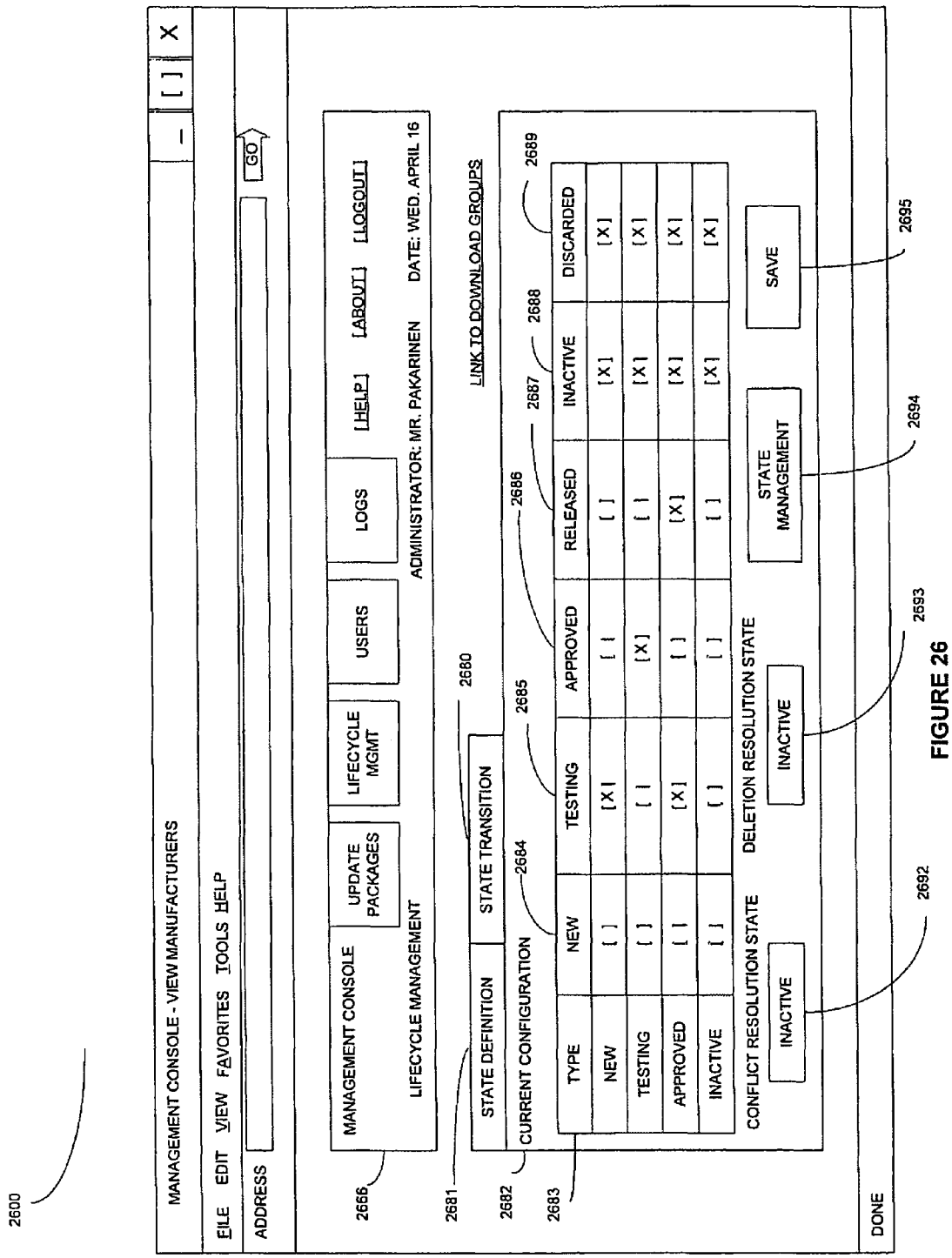
FIG. 26 is a block diagram illustrating an exemplary view manufacturers and update manufacturer device lifecycle transition screen displayable on an electronic device according to an embodiment of the present invention.

FIG. 26 is a block diagram illustrating an exemplary lifecycle transition screen 2600 and a management console header 2666 having the state transition tab selected, according to an embodiment of the present invention. From the lifecycle state transitions screen 2600, an end-user may be enabled to manage rules providing implementation of transitional states from any state to another. The end-user may also specify which states are the conflict resolution state 2692 and the deletion resolution state 2693. The end-user may also be enabled to select a state management button 2694 and save modification via a save button 2695.

By default, when an end-user creates a new state, all state transitions are unchecked. The end-user may define the transitional rules before the new state is used in lifecycle management functions.

Two special states may be specified for the system. The first special state may be a conflict resolution state 2692. Update packages may be set to the conflict resolution state 2692 of the update store module under at least the following conditions. For example, due to a primary rule for update package management, that is, whenever a new downloadable update package enters the system, any previously downloadable update package having the same source version may have its state changed to the conflict resolution state 2692. If there are multiple update package conflicts, all of the update packages may be changed to the conflict resolution state 2692. The rule may also be applicable to all update packages in a downloadable state, wherein the update packages may be changed to a non-downloadable state.

The second special state may be a deletion resolution state 2693. When a non-downloadable state is to be deleted from the system, all update packages having the deleted state may be changed to the delete resolution state 2693. An update package having the downloadable state selected may not be deleted.

The following lifecycle management rules may be supported by the update store module. The client server may have the option to send an additional "QA" parameter in an update package request. The client server may process the request by applying the following rules.

For example, no "QA" parameter (the default state) may be sent. The server may only look for update packages having the downloadable state for the downloadable group selected, permitting fast retrieval for a majority of the client server requests.

The update package may be sent with the "QA" parameter. The client server may look first for any update packages having the downloadable state selected in which the client server is a part of the downloadable group. In case of multiple matching update packages, then the update package having the highest priority of state may be used to identify a unique update package to retrieve. There may be only one state having group all download group. There may be only one source version per downloadable state. There may be multiple downloadable states for the same source version as long as the states are all different from one another. If the update selection criteria retrieves more than one update package, the priority of a state may be used to identify the unique update package to be retrieved. An end-user may not delete the state if the download group "group all" is assigned.

The conflict resolution state 2692 and the deletion resolution state 2693 may only be defined using non-downloadable states. The non-downloadable states assigned to the two special states may not be deleted. When the state having multiple update packages and the same source version are changed to the "downloadable state", all of the update packages having the same source versions may also be changed to the state defined as the conflict resolution state 2692. When a state is deleted, all the states having the deleted state may be changed to the state defined the deletion resolution state 2693. A deleted state may not be downloadable.

From the state definition screen 2600, an end-user may be able to modify the update package states. From the lifecycle configuration sub-screen 2682, an end-user may be enabled to create and manage update package states for lifecycle current configuration for the update store modules. From the current configuration table 2682, an end-user may also set the following items. The end-user may be enabled to select a state definition sub-screen 2681 or a state transition sub-screen 2680.

The end-user may be enabled to select the type of update package in an update package type column 2683. The end-user may also be enabled to provide additional information and settings by checking boxes in a plurality of parameter entry boxes and columns, such as for example, new column 2684, testing column 2685, approved column 2686, released column 2687, inactive column 2688, and discarded column 2689.

Figure 27:
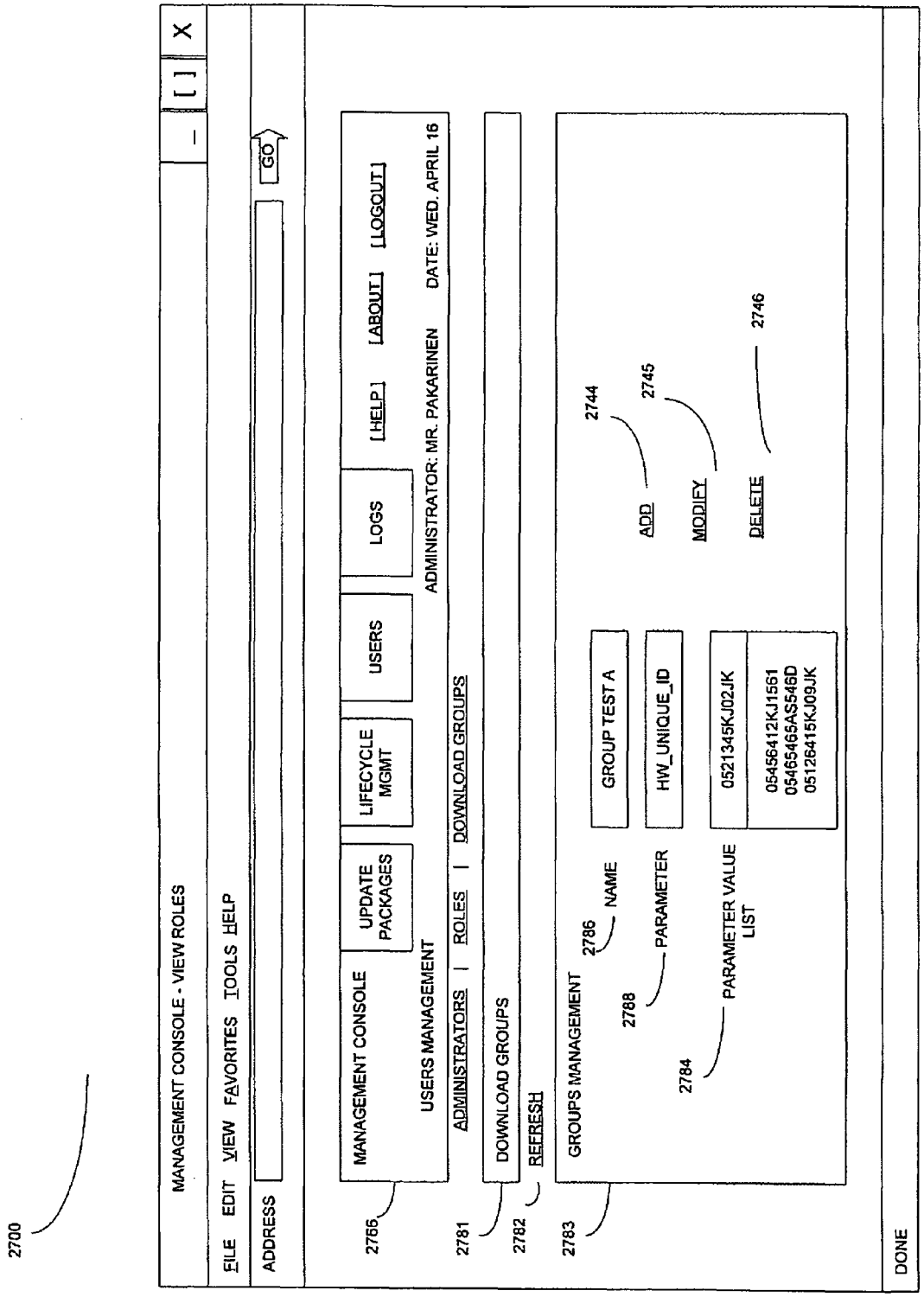
FIG. 27 is a block diagram illustrating an exemplary view roles and download group management screen displayable on an electronic device according to an embodiment of the present invention.

FIG. 27 is a block diagram illustrating an exemplary download group users management screen 2700 and a management console header 2766 having the users tab selected, according to an embodiment of the present invention. The end-user may be a member of a download group 2781. A download group 2781 may have the following attributes: a unique group name 2786, an identification parameter name 2788 determining which parameter specifies the client identification information; and a parameter value list 2784 that is a case-sensitive, regular expression matching the client identification information. The administrator may be enabled to ensure that correct values are specified, because the server may not have the ability to verify the values. The end-user may be enabled to add 2744 information to a download group, modify 2745 information related to a download group, and delete 2746 information related to a download group in a groups management sub-screen 2783. The end-user may also be adapted to refresh 2782 the users management group screen 2700 as information is modified.

An end-user account may contain the following information. Required fields which may be marked with an asterisk (*), not shown, in an embodiment according to the present invention, for example: a unique username *, a password *, a first name *, a last name *, an e-mail address, a phone number, a mobile number, a description/notes, a role *, and an account creation date (time-stamped by the system).

An administrator may be enabled to create (add) 2744 a new user account with a unique username 2786. An initial password for a new account may be asked twice and confirmed.

An administrator may be enabled to delete 2746 an existing user account. The system may confirm the deletion before committing.

An administrator may be enabled to modify 2745 all of the attributes of any user account with the following conditions: the user password may never be visible, the administrator may only set the user password to a new value, and the administrator may maintain a unique login name for the end-users.

There may be a default administrator role for full level access to the system, such as for example, the super-administrator role. Only the administrator or super-administrator role may be enabled to define and modify user information, system settings, and additional roles. The administrator may assign an upload only role, wherein an end-user may insert and only insert new update packages into any folder in the system. The update store module may create a manufacturer folder or client device model folder to support the new update package. If the update package already exists, then the new update package may replace or overwrite the old update package. The administrator may also assign an end-user with appropriate granted access to the update package hierarchical structure.

User roles may be used to determine access control to update packages. Each end-user may be assigned one role and may inherit the role's associated permissions to the update packages. A role may, for example, take on the following attributes: a unique role name, and an access control role (none, read, write, etc.) for folders and update packages.

An administrator may be enabled to create a new role for an end-user. The electronic device system may have, for example, a default access control matrix allowing appropriate (for example, read/write) permissions for all folders and update packages.

An administrator may also be enabled to delete an existing role, if no end-user is assigned to the role. The system may confirm the deletion with the administrator.

There may be access control associated with update package files. The table below specifies the behavior for appropriate (for example, read/write) permissions on folders (for example, manufacturers name and client model). The access control framework may be specified in a user account management section.

TABLE 2

Access Rights Management

| | Read Permission | Write Permission |
|---|---|---|
| Folder | Can only see the list of items within the folder. | Can add update package files to the folder. (Read implied) |

Table 2 illustrates a listing of access rights management according to an embodiment of the present invention.

There may be support for the download group in the update store module. The download group may comprise a grouping of client identification information identifying end-users enabled to download an update package in a particular downloadable state.

There may be a default group or non-removable download group in the update store module. The default group may, for example, permit connected clients to download update packages regardless of the client identification information provided.

The system may use the simple network management protocol (SNMP) notification mechanism to generate and receive alarm notifications. A SNMP notification (for example, in versions 2 and 3, SNMP v.2 and v.3) may often be referred to as an SNMP trap (for example, as in SNMP v.1). Alarm notification messages may be sent in SNMP notification format over the network to any end-user-specified SNMP console. In addition to the management information base (MIB) provided by an application server, the update management system may provide a number of specific MIB for alarms and configurations.

A private management information base (MIB) including all managed objects may be defined. The private MIB may be defined in accordance with the structure of management information version 2 (SMI v.2) rules. An MIB may be provided by an application server and may be loaded into an SNMP console for an end-user to view, query, and manage the configuration and alarm objects.

The update management system may be managed using available SNMP console applications.

Figure 28:
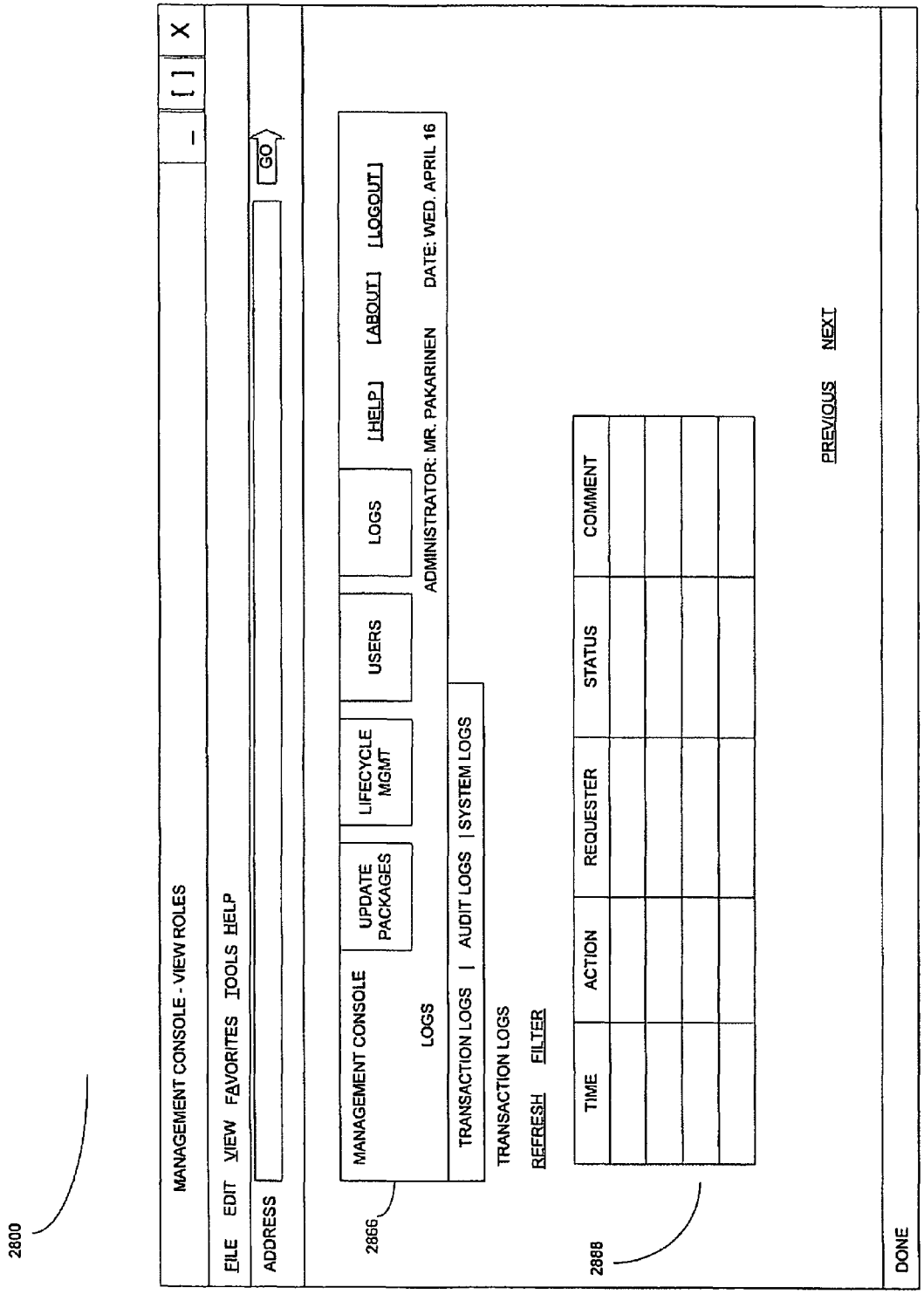
FIG. 28 is a block diagram illustrating an exemplary view roles and transaction log screen displayable on an electronic device according to an embodiment of the present invention.

FIG. 28 is a block diagram illustrating an exemplary view roles and transaction log screen 2800 and a logs management console header 2866, according to an embodiment of the present invention. The update management system may allow full visibility into the electronic device system via logging services. The logging services may be consolidated to allow administrators a central place to review logs for all update store modules and delivery modules currently deployed. The update management system may maintain at least some of the following logs: a transaction log, an audit log, and a system log, for example. Each of the logs (for example, transaction log 2888 as illustrated in FIG. 28) may support at least some of the following features: a time/date range filter to limit the amount of log to be displayed sort-able in a date/time column, and refreshable on a configurable interval, an action column, a requester column, a status column, and a comments column.

The transaction log may be consolidated from all the download modules currently in the electronic device system. The transaction log may display detail information for each attempt from client(s) to request update packages.

Figure 29:
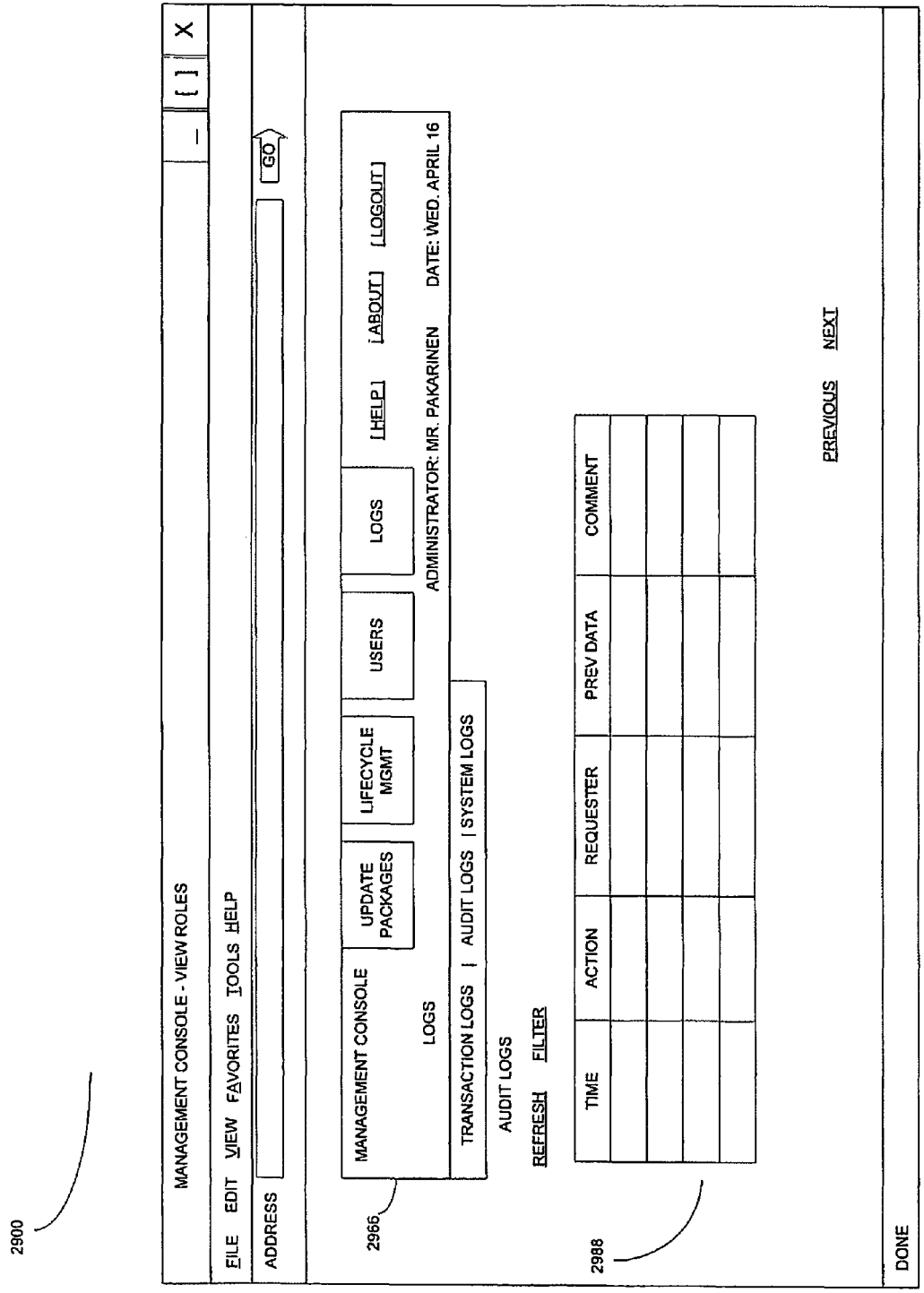
FIG. 29 is a block diagram illustrating an exemplary view roles and audit log screen displayable on an electronic device according to an embodiment of the present invention.

FIG. 29 is a block diagram illustrating an exemplary view roles and audit log screen 2900 and a logs management console header 2966, according to an embodiment of the present invention. The audit log 2988 may provide detailed audit trails of actions performed by all end-users of the update management system. The end-user actions may comprise lifecycle management definition and modification, modification of system parameters, and uploading of update packages. Each of the logs (for example, audit log 2988 as illustrated in FIG. 29) may support at least some of the following features: a time/date range filter to limit the amount of log to be displayed sort-able in a date/time column, and refreshable on a configurable interval, an action column, a requester column, a status column, and a comments column.

Figure 30:
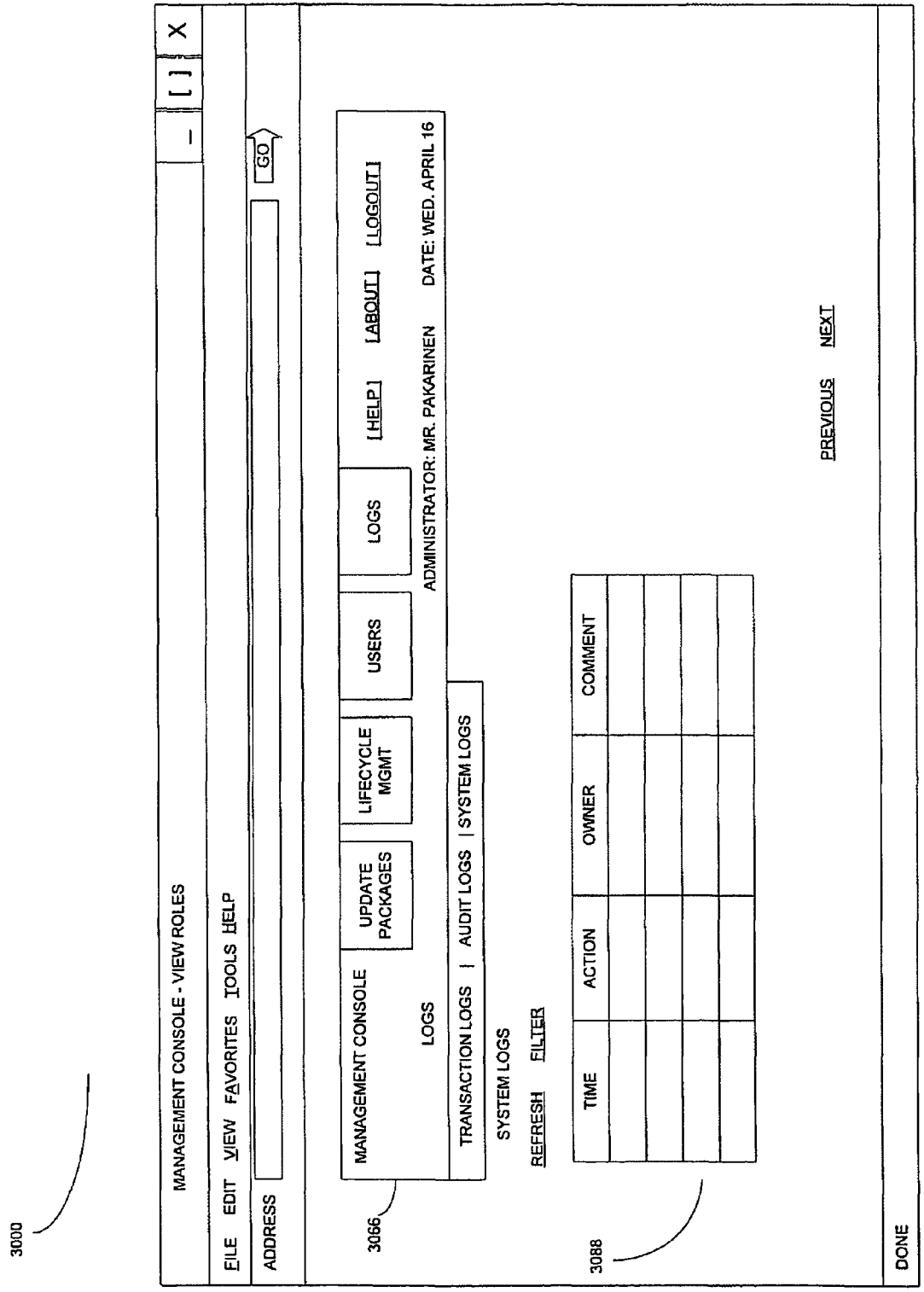
FIG. 30 is a block diagram illustrating an exemplary view roles and system log screen displayable on an electronic device according to an embodiment of the present invention.

FIG. 30 is a block diagram illustrating an exemplary view roles and system log screen 3000 and a logs management console header 3066, according to an embodiment of the present invention. The system log 3088 may display all other remaining system activities not considered in a transaction trail and/or an audit trail. System information may be useful for administrators in troubleshooting the system. Each of the logs (for example, system log 3088 as illustrated in FIG. 29) may support at least some of the following features: a time/date range filter to limit the amount of log to be displayed sort-able in a date/time column, and refreshable on a configurable interval, an action column, a requester column, a status column, a previous data column, an owner column, and a comments column.

Figure 31:
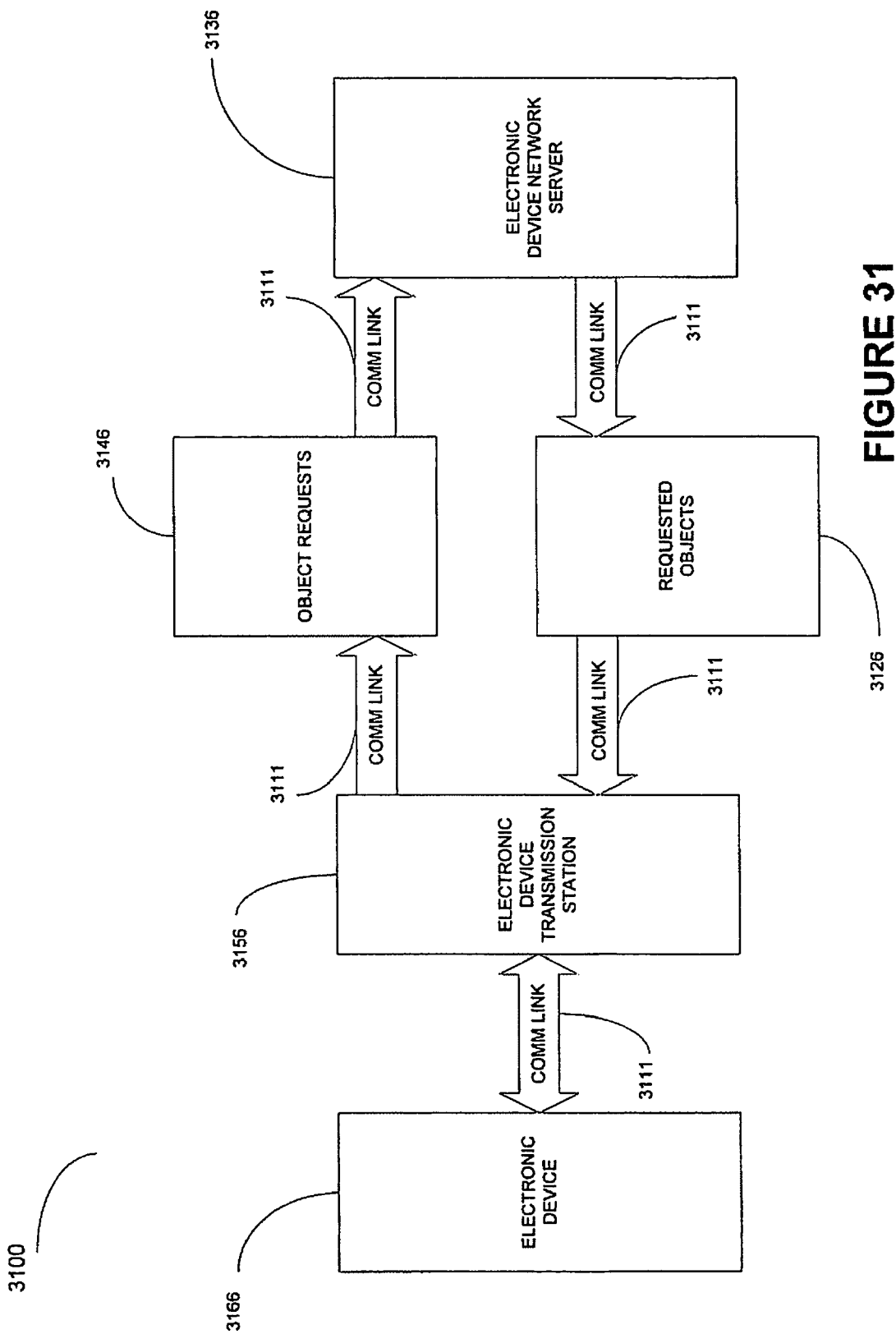
FIG. 31 is a block diagram illustrating an exemplary electronic device network employing an update package request and delivery method according to an embodiment of the present invention.

FIG. 31 is a block diagram illustrating an exemplary electronic device network 3100, according to an embodiment of the present invention. Aspects of the present invention may be found in updating separate components having significant interdependencies in a wireless electronic device comprising methods for tracking and ensuring that software dependencies are accounted for during an update process.

Aspects of the present invention may be found in a method of updating an electronic device 3166 wherein the electronic device may communicate an update request via a communications link 3111 to an electronic device transmission station or transmission tower 3156. The electronic device transmission station may transmit the object request(s) 3146 associated with the update package request via another wired or wireless communications link 3111 to the electronic device network server 3136 managing update requests. The electronic device network server 3136 may respond to the update package requests by transmitting the requested objects 3126 via a communications link 3111 to the electronic device transmission station 3156 and ultimately to the electronic device 3166.

Dependencies may exist between different objects within a software system and at different levels of the system. For example, Java midlets/applets may have a dependency to a particular keyboard/video/mouse (KVM) arrangement. A KVM arrangement may have dependencies associated with a particular firmware revision. A particular firmware revision may have dependencies associated with a particular set of configuration parameters stored in separate files in the file system.

Dependencies may be managed via a joint server-client solution adapted to track revisions of objects within a particular manufacturers device, maintain a list of dependencies between objects based upon a manufacturer-by-manufacturer analysis, and ensure that dependencies are accommodated before allowing update of a requested electronic device object.

Mobile electronic devices, such as cellular phones/handsets, for example, may contain a catalog (management information base (MIB)) containing the identity and revision of each updateable component within the mobile electronic device 3166. When the mobile electronic device 3166 requests, from the electronic device network 3100, an update package for updating a particular component, the mobile electronic device 3166 may also transmit the corresponding catalog to the server 3136 along with and as part of the request.

The electronic device network server 3136 may be adapted to maintain a list of valid components for a particular electronic device/model 3166, and a list of dependencies associated with each component. The electronic device network server 3136 may evaluate the requested item(s), and compare the requested item(s) to a list of dependencies associated with the electronic device catalog. If there is a dependency match in the catalog, and the revision of the object in the catalog is later than a required revision, the request may be fulfilled or served.

If the electronic device catalog indicates that there are items which may not support a newly requested update item, the electronic device may be updated recursively until the electronic device 3166 is able to support the requested update item. The end-user may be notified of dependencies via the electronic device user interface (UI), and may be prompted to also upgrade associated components.

The aforementioned method works well for objects that are adapted to be upgraded at the application level. Individual component upgrades at the application level may not affect the basic abilities of the mobile electronic device 3166, for example, the ability to successfully boot, acquire service, and make/receive voice/data connections to the electronic device network. Additionally, if the upgrades are performed in a particular order, the objects being upgraded at this level may be updated in independent sessions.

The same may not be said of firmware upgrades and their associated dependencies. The update of firmware and firmware dependent information may happen at the same time, so that when a new software boots, the software's dependent data may be immediately made available. The configuration data and code may match on a version-by-version basis in order for the upgrade operation to be successful.

Figure 32:
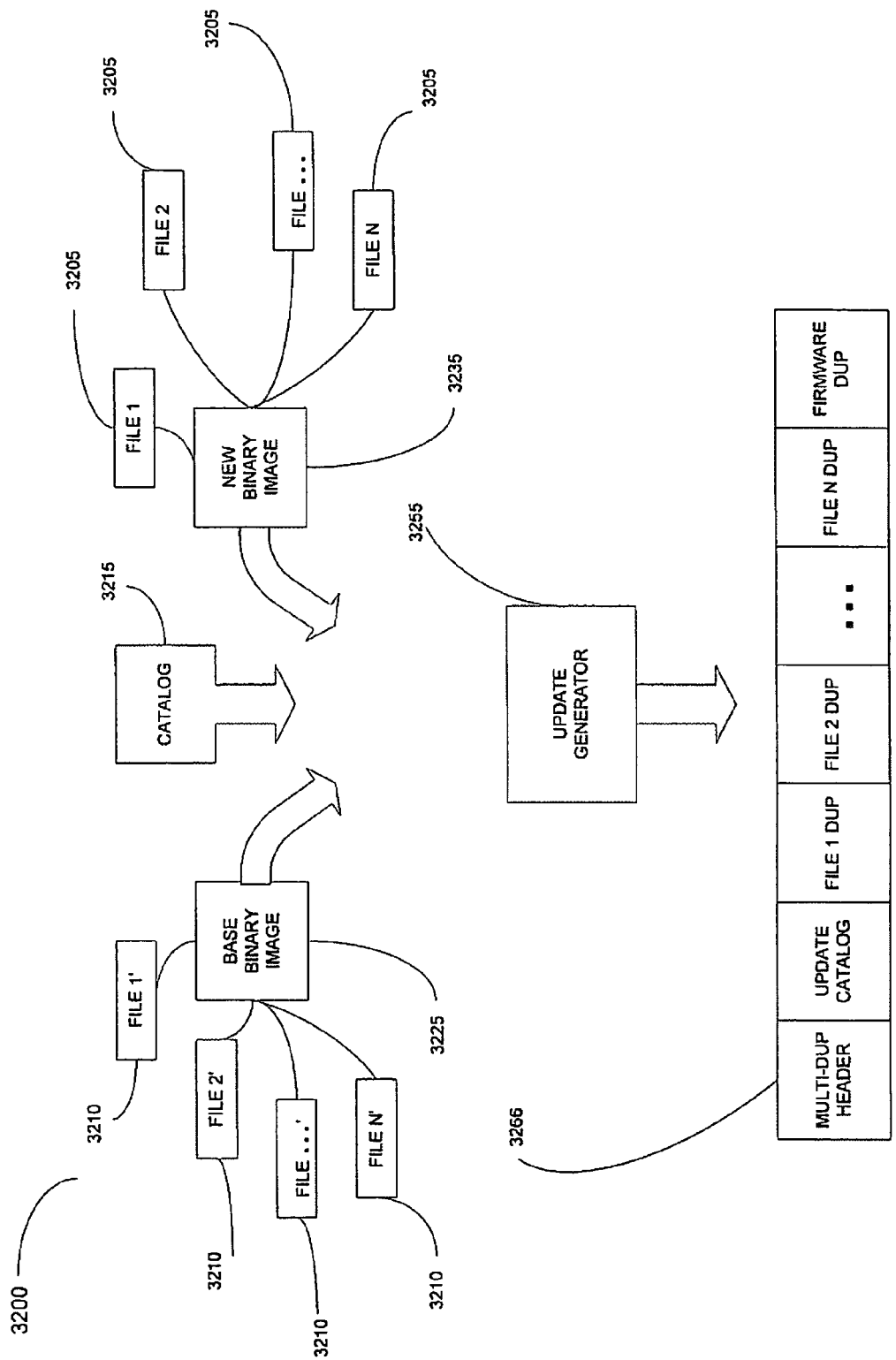
FIG. 32 is a block diagram illustrating an exemplary method of update package generation according to an embodiment of the present invention.

FIG. 32 is a block diagram illustrating an exemplary method of update package generation 3200, according to an embodiment of the present invention. In an embodiment according to the present invention, the update generator 3255 may take as input, at least two binaries (elf files) comprising a base binary image 3225 and a new binary image 3235 and a plurality of associated files (file 1'-file N', 3210) and (file 1-file N, 3205) and generate an update package 3266 having instructions for updating an electronic device's firmware. The upload update package catalog 3215 may also be included in the update package 3266 created.

Aspects of the present invention may be found in adding not only firmware binaries, such as 3225 and 3235, for example, but also any firmware dependant files (file 1'-file N', 3210) and (file 1-file N, 3205), for example, as inputs to the update generator 3255. The files 3210, 3205 may comprise data and/or code.

In an embodiment according to the present invention, the electronic device's initial binary image 3225 may be used to create a universal dictionary that may be used to encode different firmware/software dependent files being bundled in the upgrade process in mini-update packages. The mini-update packages may be bundled into a single update package 3266 along with a firmware update package to create a multi-duplex update package (multi-DUP) 3266, i.e., an update package adapted to update a plurality of software application, firmware, and other electronic device components using one update package.

A catalog 3215 comprising all firmware dependencies may be included in the new DUP 3266. The dependency information may be prepared by the manufacturer and provided as an input at the time of update package creation. The dependencies may be applicable to configuration data pertaining to firmware, but could also be applications required by a particular firmware package. The catalog 3215 may contain identifier and revision information for a particular object to be updated, as well as an indication of whether the update may remain uncompressed or be compressed. Object identifiers and revision numbers may be defined based upon a manufacturer-by-manufacturer analysis.

Once the multi-DUP 3266 is delivered to the electronic device, an update agent in the electronic device may interrogate the header and compare the files present in the multi-DUP 3266 with a required list resident in the update catalog. If the header and catalog compare favorable, the update agent may be enabled to proceed. However, if files are missing from the multi-DUP 3266, the update agent may interrogate the file system an electronic device network server to locate the additional dependent files there. If the files are found, the update may proceed. If not, the update package 3266 may be removed and the electronic device components update status may be set to "no update required".

Having the update agent check the file system provides flexibility for the update agent to work with additional management protocols. If this approach is taken, the management protocols may be used to deliver appropriate files (compressed or uncompressed) to the electronic device. The multi-DUP 3266 may not contain mini-DUPs associated with the files, but may have a catalog entry indicating that an upgrade of this component is required. The update agent may know whether or not to uncompress the files by interrogating the entry in the dependency catalog.

Aspects of the present invention may be found in an update agent adapted to perform update of the required files in the file system first. The update agent may create a new version of the file while maintaining the old file and filename. Once the new versions of the required files have been successfully created, the firmware upgrade process may proceed. During the upgrade process, the update agent may also write the contents of the new files over and into the old files and file storage locations and update the electronic device's catalog information with information from the catalog 3215 in the multi-DUP 3266 delivered to the electronic device. The electronic device may be reset and the software may be booted. The dependencies may all be accounted for upon completion of the update.

Aspects of the present invention may be found facilitating update of individual components (other than firmware), accounting for dependencies between components, permitting a roll-back mechanism to recover from aborted updates, and providing an electronic device flexibility to work with defined management protocols, as necessary, but also be adapted to provide a stand-alone electronic device update.

Accordingly, the present invention may be realized in hardware, software, firmware and/or a combination thereof. The present invention may be realized in a centralized fashion in at least one computer system, or in a distributed fashion where different elements are spread across several interconnected computer systems. Any kind of computer system or other apparatus adapted for carrying out the methods described herein may be suitable. A typical combination of hardware and software may be a general-purpose computer system with a computer program that, when being loaded and executed, controls the computer system to carry out the methods described herein.

The present invention may also be embedded in a computer program product comprising all of the features enabling implementation of the methods described herein which when loaded in a computer system is adapted to carry out these methods. Computer program in the present context means any expression, in any language, code or notation, of a set of instructions intended to cause a system having information processing capability to perform a particular function either directly or after either or both of the following: a) conversion to another language, code or notation; and b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A carrier network supporting lifecycle management of update packages for updating at least one of firmware and software in a plurality of electronic devices, the carrier network comprising:
   at least one server comprising computer-readable memory having stored therein software for managing lifecycle information associating state information with an update package for updating at least one of a firmware and software version of at least one of the plurality of electronic devices, wherein the state information indicates new, testing, approved, released, active and inactive states of each update package, wherein an end-user of an electronic device is enabled to manage the state information via a user interface, the end-user being a customer or subscriber to services provided by the carrier network, and wherein the user interface permits only one source version of each update package per state and permits multiple different states for a given source version;
   storage software for managing the storage of update packages;
   server software supporting the delivery of a stored update package to the at least one of the plurality of electronic devices via a communication network, based upon the state information associated with the stored update package; and
   wherein the update packages comprise a set of executable instructions for converting in the at least one of the plurality of electronic devices a first version of at least one of firmware and software to a second version.

2. The carrier network of claim 1 comprising:
   diagnostics software capable of collecting and analyzing information associated with the carrier network.

3. The carrier network of claim 1 comprising:
   software supporting at least one of billing and provisioning for the carrier network.

4. The carrier network of claim 1 comprising:
   software supporting a management console providing a user interface for communicating lifecycle information.

5. The carrier network of claim 4 wherein the lifecycle information is communicated using an Internet protocol.

6. The carrier network of claim 5 wherein the Internet protocol comprises at least one of hypertext markup language (HTML), extensible markup language (XML), and hypertext transfer protocol (HTTP).

7. The carrier network of claim 1 wherein the communication network comprises a wireless network.

8. The carrier network of claim 7 wherein the wireless network comprises a cellular telephone network.

9. The carrier network of claim 1 wherein the plurality of electronic devices comprises at least one of a mobile handset, a cellular telephone, a pager, a personal digital assistant, and a personal computer.

10. The carrier network of claim 1 wherein each of the plurality of electronic devices comprises:
    download software for receiving an update package; and
    at least one update agent capable of updating at least one of firmware and software using the received update package.

11. The carrier network of claim 1 wherein each of the plurality of electronic devices comprises:
    firmware capable of authenticating a received update package.

12. The carrier network of claim 1, wherein the state information comprises priority for the associated update package.

13. The carrier network of claim 1, wherein the state information comprises a state name.

14. A method of managing, via a communication network, a lifecycle of at least one of software and firmware in a plurality of electronic devices each having associated therewith at least one device characteristic, the method comprising:
    receiving an update package for updating the at least one of software and firmware in at least a portion of the plurality of electronic devices;
    receiving, via a user interface, lifecycle information associating state information for the received update package with the at least a portion of the plurality of electronic devices, wherein the state information indicates new, testing, approved, released, active and inactive states of each update package, wherein an end-user of an electronic device is enabled to manage the state information via the user interface, the end-user being a customer or subscriber to services provided by the carrier network, and wherein the user interface permits only one source version of each update package per state and permits multiple different states for a given source version;

storing the received update package using the lifecycle information;

receiving an update package request comprising at least one device characteristic; and transmitting, via the communication network to at least one of the plurality of electronic devices, an update package retrieved using the at least one device characteristic and the state information of the associated lifecycle information.

15. The method of claim 14 wherein the communication network comprises a wireless network.

16. The method of claim 15 wherein the communication network comprises a cellular telephone network.

17. The method of claim 14 wherein the plurality of electronic devices comprises a mobile handset, a cellular telephone, a pager, a personal digital assistant, and a personal computer.

18. The method of claim 14 wherein the at least one device characteristic comprises at least one of firmware version identification information, software version identification information, and operating system information.

19. The method of claim 14 wherein the at least one device characteristic comprises at least one of electronic device information, hardware component identification information, manufacturer identification information, and device model identification information.

20. The method of claim 14 wherein the update package comprises a set of executable instructions for converting at least one of software and firmware from a first version to a second version.

21. The method of claim 14 wherein the user interface is communicated using an Internet protocol.

22. The method of claim 21 wherein the Internet protocol comprises at least one of hypertext markup language (HTML), extensible markup language (XML), and hypertext transfer protocol (HTTP).

23. The method of claim 14 wherein the update package is received from one of a manufacturer of at least a portion of the plurality of electronic devices and a third party software developer.

24. The method of claim 14 comprising:
updating the lifecycle information based upon at least one of receiving an update package, storing the received update package, receiving an update package request, and transmitting a stored update package to an electronic device.

25. The method of claim 14, wherein the state information comprises priority for the associated update package.

26. The method of claim 14, wherein the state information comprises a state name.

27. A system for managing lifecycle information for a plurality of wireless mobile devices, the system comprising:
at least one processor operably coupled to memory storing one or more update packages for updating at least one of software and firmware in a plurality of wireless mobile devices, each of the one or more update packages having associated lifecycle information comprising state information, wherein the state information indicates new, testing, approved, released, active and inactive states of each update package, wherein an end-user of a wireless mobile device is enabled to manage the state information via a user interface, the end-user being a customer or subscriber to services provided by the carrier network, and wherein the user interface permits only one source version of each update package per state and permits multiple different states for a given source version;
the at least one processor capable of receiving an update request;
the at least one processor capable of retrieving one of the one or more update packages, based upon the received update request and lifecycle state value of the associated lifecycle information;
the at least one processor capable of delivering the retrieved one of the one or more update packages via a wireless communication network; and
the at least one processor capable of modifying the state information of the associated lifecycle information based upon at least one of the storing, receiving, retrieving, and delivering.

28. The system of claim 27 wherein the plurality of wireless mobile devices comprise at least one of a mobile handset, a cellular telephone, a pager, a personal digital assistant, and a personal computer.

29. The system of claim 27 wherein the one or more update packages comprise a set of executable instructions for converting a first version of at least one of software and firmware to a second version.

30. The method of claim 27, wherein the state information comprises priority for the associated update package.

31. The method of claim 27, wherein the state information comprises a state name.

* * * * *